US012558658B2

(12) United States Patent
    Ostenson et al.

(10) Patent No.: US 12,558,658 B2
(45) Date of Patent: Feb. 24, 2026

(54) DRUM FOR PROCESSING MIXED SOLID WASTE

(71) Applicant: Prototype Garage LLC, Little Canada, MN (US)

(72) Inventors: Haakon Ostenson, Shoreview, MN (US); Greg White, Lino Lakes, MN (US); Olaf Lee, Columbus, MN (US)

(73) Assignee: Prototype Garage LLC, Little Canada, MN (US)

( * ) Notice: Subject to any disclaimer, the term of this patent is extended or adjusted under 35 U.S.C. 154(b) by 3 days.

(21) Appl. No.: 18/813,679

(22) Filed: Aug. 23, 2024

(65) Prior Publication Data

US 2024/0408645 A1 Dec. 12, 2024

Related U.S. Application Data

(63) Continuation of application No. PCT/US2023/063550, filed on Mar. 2, 2023.
(Continued)

(51) Int. Cl.
    B01F 29/63 (2022.01)
    B01F 29/00 (2022.01)
    (Continued)

(52) U.S. Cl.
    CPC .......... B01F 29/63 (2022.01); B01F 29/4034 (2022.01); B01F 31/50 (2022.01);
    (Continued)

(58) Field of Classification Search
    CPC ...... B01F 29/63; B01F 29/4034; B01F 31/50; B01F 35/31; B01F 35/32; B01F 35/43;
    (Continued)

(56) References Cited

U.S. PATENT DOCUMENTS

| | | | |
|---|---|---|---|
| 4,662,893 A | 5/1987 | McIntosh | |
| 5,460,085 A | 10/1995 | Cappellari et al. | |

(Continued)

FOREIGN PATENT DOCUMENTS

| | | |
|---|---|---|
| BE | 1016213 A3 | 5/2006 |
| EP | 0521685 A2 | 1/1993 |

(Continued)

OTHER PUBLICATIONS

Extended European Search Report issued in European Patent Application No. 21862372.6, mailed on Sep. 3, 2024, 9 pages.
(Continued)

*Primary Examiner* — Jacob S. Scott
*Assistant Examiner* — Miraj T. Patel
(74) *Attorney, Agent, or Firm* — Dorsey & Whitney LLP

(57) ABSTRACT

A rotatable drum system includes a frame and a drum rotationally supported thereon. Paddles in an interior of the drum are angularly offset from the longitudinal axis. An eccentric opening offset from the longitudinal axis forms the egress. Mixed solid waste agitated by the paddles while in the drum. Trunnions may support the drum. An actuator may be pivotable with an upper frame relative to a lower frame and the actuator can cause drum rotation irrespective of a position of the upper frame relative to the lower frame. A trunnion assembly with a rocker pivotally coupled to a base thereof via a first axle, enables the rocker to be pivotable relative to the base about the first axle. A second axle may be rotationally coupled to the rocker. A roller may be rotationally coupled to the rocker via the second axle, and configured to support a rotating load.

20 Claims, 25 Drawing Sheets

Related U.S. Application Data

(60) Provisional application No. 63/316,092, filed on Mar. 3, 2022, provisional application No. 63/316,120, filed on Mar. 3, 2022, provisional application No. 63/316,112, filed on Mar. 3, 2022.

(51) Int. Cl.

| | | |
|---|---|---|
| *B01F 31/50* | (2022.01) | |
| *B01F 35/30* | (2022.01) | |
| *B01F 35/31* | (2022.01) | |
| *B01F 35/32* | (2022.01) | |
| *B01F 35/43* | (2022.01) | |
| *B07B 1/24* | (2006.01) | |
| *B09B 3/38* | (2022.01) | |

(52) U.S. Cl.
CPC .............. *B01F 35/31* (2022.01); *B01F 35/32* (2022.01); *B01F 35/43* (2022.01); *B07B 1/24* (2013.01); *B09B 3/38* (2022.01); *B01F 2035/352* (2022.01); *B07B 2230/01* (2013.01)

(58) Field of Classification Search
CPC . B01F 2035/352; B07B 1/24; B07B 2230/01; B09B 3/38; B09B 2101/25
See application file for complete search history.

(56) References Cited

U.S. PATENT DOCUMENTS

| | | | |
|---|---|---|---|
| 5,484,247 | A | 1/1996 | Clark et al. |
| 5,875,979 | A | 3/1999 | Walters et al. |
| 6,409,106 | B1 | 6/2002 | Levasseur et al. |
| 7,226,006 | B2 | 6/2007 | Porter et al. |
| 7,497,392 | B2 | 3/2009 | Lee et al. |
| 8,034,132 | B2 | 10/2011 | Lee et al. |
| 10,272,402 | B2 * | 4/2019 | Tun ........................ B01F 29/60 |
| 2004/0226867 | A1 | 11/2004 | Tse |
| 2006/0169857 | A1 | 8/2006 | Hawkins et al. |
| 2013/0171725 | A1 | 7/2013 | Koh |
| 2013/0220893 | A1 | 8/2013 | Sukkar |
| 2016/0257923 | A1 | 9/2016 | Lee |
| 2022/0062963 | A1 | 3/2022 | Lee et al. |

FOREIGN PATENT DOCUMENTS

| | | | |
|---|---|---|---|
| EP | 2753547 | B1 | 5/2015 |
| EP | 2477747 | B1 | 3/2019 |
| GB | 2230004 | A | 10/1990 |
| JP | 2000246697 | A | 9/2000 |
| JP | 2019022896 | A | 2/2019 |
| WO | 9014890 | A1 | 12/1990 |
| WO | 2022046433 | | 3/2022 |
| WO | 2023168320 | A2 | 9/2023 |

OTHER PUBLICATIONS

International Preliminary Report on Patentability issued in International Application No. PCT/US2023/063550, mailed on Sep. 12, 2024, 9 pages.

International Preliminary Report on Patentability issued in International Application No. PCT/US2023/063552, mailed on Sep. 12, 2024, 9 pages.

International Preliminary Report on Patentability issued in International Application No. PCT/US2021/045856, mailed on Mar. 9, 2023, 9 pages.

International Search Report and Written Opinion issued in International Application No. PCT/US2021/045856, mailed on Nov. 30, 2021, 10 pages.

International Search Report and Written Opinion issued in International Application No. PCT/US2023/063550, mailed on Nov. 22, 2023, 13 pages.

International Search Report and Written Opinion issued in International Application No. PCT/US2023/063552, mailed on Nov. 22, 2023, 12 pages.

First Examination Report issued in Australian Application No. 2023228674, mailed on Aug. 20, 2025, 6 pages.

First Examination Report issued in Australian Patent Application No. 2023227545, mailed on Aug. 21, 2025, 3 pages.

First Office Action Issued in Mexican Application No. MX/a/2023/002375, notified on Nov. 14, 2025, 8 pages including 4 pages of English translation.

Culpepper, "Rotating Drum Composter Design Guide", Camp Treetops North Country School and Camp Treetops, 16 pages, Jan. 8, 2020.

\* cited by examiner

110

—200

ROTATE DRUM FOR PROCESSING THE MIXTURE OF MIXED SOLID WASTE AND WATER —210

RECEIVE A MIXTURE OF MIXED SOLID WASTE AND WATER AT THE INGRESS OF THE DRUM —220

PIVOT DRUM ALONG ITS LONGITUDINAL AXIS AT AN ANGLE —225

CAUSING THE MIXTURE TO EXIT THE EGRESS OF THE DRUM AT A FIRST WALL PORTION OF AN THE ECCENTRIC OPENING OF THE DRUM —230

DRUM FOR PROCESSING MIXED SOLID WASTE

CROSS-REFERENCE TO RELATED APPLICATIONS

This application is a continuation of International Patent Application PCT/US2023/063550 filed Mar. 2, 2023, which in turn claims priority to U.S. Provisional Patent Application No. 63/316,092 filed on Mar. 3, 2022 entitled "DRUM FOR PROCESSING MIXED SOLID WASTE", and U.S. Provisional Patent Application No. 63/316,112 filed on Mar. 3, 2022 entitled "DRIVE ASSEMBLY", and U.S. Provisional Patent Application No. 63/316,120 filed on Mar. 3, 2022 entitled "SELF-ALIGNING TRUNNION", each of which are herein incorporated by reference in their entireties for any useful purpose.

This application relates to commonly owned, U.S. Provisional Patent Application No. 63/316,105 filed on Mar. 3, 2022 entitled "LIQUID-DRIVEN SEPARATION SYSTEM AND METHOD FOR SEPARATING ORGANIC MATERIALS FROM DRENCHED MIXED SOLID WASTE" and co-pending U.S. patent application having U.S. application Ser. No. 17/401,497, filed on Aug. 13, 2021 and entitled "METHOD AND APPARATUS FOR SEPARATING WASTE MATERIALS", which claims priority to U.S. Provisional Application Ser. No. 63/071,114, filed on Aug. 27, 2020, each of which are herein incorporated by reference in their entireties for any useful purpose.

TECHNICAL FIELD

Systems and methods provide rotatable drum systems, drive systems and assemblies, and radial trunnion and thrust trunnion assemblies for use in of operating such rotatable drum systems.

BACKGROUND

Recycling programs are commonplace for households and businesses, but divert only a portion of recyclable and compostable material away from landfills or incineration. Discarded waste, e.g., municipal mixed solid waste (MSW), collected by waste companies typically contain 40 to 60 wt % recyclable, compostable or biodegradable material. Several approaches have been used to convert MSW into fuel or to reclaim recyclable materials. For instance, U.S. Pat. Nos. 7,497,392 and 8,034,132 disclose processes and apparatuses that use a pressure vessel to transform solid waste into fuel by adding steam to the vessel over a period of time. US 20160257923 A1 discloses methods and apparatuses that use a vacuum below atmospheric pressure to break cell walls in organic material to increase available free sugars and convertible surface area.

These prior approaches use vessels to treat solid waste using steam, and process the waste at increased temperature and pressure. Moisture, temperature, and pressure varies within the vessel, and rotary agitation can cause the solid waste product to degrade into fuel while separating non-fuel waste components such as metal, glass, and plastic using magnets, density, and particle size-type separating systems such as a trommel or flat bed separator.

While known systems and methods are suited for their intended purposes, the approaches herein provide waste treatment methods and apparatuses for processing waste to prepare the waste for separation into recyclable fractions that does not rely on steam or vacuum, or convert the recyclable material into fuel.

In addition, the management and processing of municipal solid waste streams has become increasingly complex due to decreasing landfill space, voluntary recycling programs (often with disparate materials co-mingled), local recycling mandates, increases in online shopping (in which nearly every purchase is shipped with some sort of packaging material), and the like. One aspect of such programs is the need to process ever increasing amounts of fibrous material such as paper, cardboard, and other packaging materials. For example, as more retail shopping is conducted with online retailers, the amount of fibrous packaging material (boxes, envelopes, dunnage, etc.) has increased dramatically. Improved systems and methods of processing such waste into valuable recycled materials are needed.

SUMMARY

A solid waste processing system is disclosed.

A rotatable drum system may include a vessel for processing a mixture of mixed solid waste (MSW). The vessel may be a rotatable cylindrical drum comprising an ingress at a proximal open end and an egress at a distal end, which is configured to rotate about its longitudinal axis. A plurality of paddles may be joined to an internal surface of the drum and arranged angularly offset from the longitudinal axis. An end cap defines an eccentric opening offset from the longitudinal axis and forms the egress at the distal end. The eccentric opening may be defined by the end cap such that the end cap forms a first wall portion having a height that is shorter than a second wall portion of the end cap. In operation, the mixture of MSW and water may be received at the ingress during rotation of the drum such that the angularly offset plurality of paddles agitate and urge the received mixture towards the ingress to thereby facilitate retention of the mixture of in the drum. During such rotation of the drum, the mixture advances towards the end cap, and as a level of the mixture reaches the height of the first wall portion, the mixture exits the eccentric opening.

In various implementations and alternatives, the vessel may include a plurality of lifters joined to the internal surface of the drum and may extend along the longitudinal axis from the ingress to the egress, where during the rotation of the drum, the plurality of lifters agitate the mixture within the drum. In such implementations and alternatives, the at least one of the plurality of lifters may be arranged perpendicular to the first wall portion, and a width of the at least one lifter at the first wall portion may be the same as the height of the first wall portion such that the at least one lifter guides the mixture out of the egress. In addition or alternatively, at least one of the plurality of lifters may be arranged perpendicular to the second wall portion, and a width of the at least one lifter at the second wall portion may be shorter than a height of the second wall portion such that the at least one lifter facilitates retention of the mixture within the drum. In some implementations, at least one of the plurality of lifters is arranged perpendicular to the second wall portion, and a width of the at least one lifter at the second wall portion is shorter than a height of the second wall portion such that the at least one lifter facilitates retention of the mixture within the drum.

In various implementations and alternatives, the vessel further includes another plurality of paddles joined to an interior of the drum and arranged angularly offset from the longitudinal axis such that the another plurality agitate and urge the received mixture towards the egress to thereby facilitate movement of the mixture towards the egress. In addition or alternatively, the drum may be configured to be pivoted about the longitudinal axis from 0 to 25 degrees to adjust a rate of egress of the MSW from the eccentric opening, and for instance a drive device may be provided for causing the drum to rotate, such that the drive device is configured to pivot with the drum. The drive device may be a chain drive. In addition or alternatively, the drum may define jacketed sidewalls such that the mixture is retained in the drum until reaching the egress. The plurality of paddles may for instance be arranged in a helical pattern around the longitudinal axis.

In other implementations, a method of processing a mixture of MSW and water in a drum includes the step of rotating a cylindrical drum about its longitudinal axis thereof. The drum may include an ingress at a proximal open end and an egress at a distal end, a plurality of paddles joined to an internal surface of the drum and arranged angularly offset from the longitudinal axis, and an end cap defining an eccentric opening offset from the longitudinal axis. The method may proceed by loading the mixture of MSW and water into the rotating drum at the ingress. The mixture of MSW and water may be received at the ingress of the drum such that the angularly offset plurality of paddles agitate and urge the received mixture towards the ingress during rotation of the drum to thereby facilitate retention of the mixture of in the drum. During the rotation of the drum, the mixture advances towards the end cap, where the end cap defines an eccentric opening offset from the longitudinal axis forming the egress at the distal end, and where the eccentric opening is defined by the end cap such that the end cap forms a first wall portion having a height that is shorter than a second wall portion of the end cap, and as a level of the mixture reaches the height of the first wall portion, the mixture exits the eccentric opening.

In various implementations and alternatives, the method may involve pivoting the drum about the longitudinal axis by an angle of about 0.5 to 25 degrees to adjust a residence time of the mixture in the drum. For instance, a residence time of the mixture in the drum results in organics in the MSW being hydrated to about 70 to about 100 percent. In addition or alternatively, prior to the step of loading, the method may involve processing the MSW in a bag opener to release MSW from bags. For instance, the bag opener may operate to release MSW from bags using jetted water nozzles, and the mixture of MSW and water may be received from the bag opener. In another example, the mixture of MSW and water may be received from the bag opener continuously from a chute leading from the bag opener to the ingress of the drum. The water in the mixture may be provided at about 50 to 150 gpm. The MSW in the mixture may be provided at about 100 to 200 pounds per minute.

The cylindrical drum used in the described method may include features described throughout the summary and detailed description, and for instance, another plurality of paddles may be joined to an interior of the drum and arranged angularly offset from the longitudinal axis such that during the rotation of the drum, the another plurality agitate and urge the received mixture towards the egress to thereby facilitate movement of the mixture towards the egress.

In another embodiment, the solid waste processing system includes a lower frame configured to be disposed on a support surface; an upper frame pivotally coupled to the lower frame; a drive system coupled to, and movable with, the upper frame relative to the lower frame; and a drum rotationally supported on the upper frame. The drum includes an inlet and an outlet both configured to receive solid waste.

Optionally, in some embodiments, the solid waste processing system includes a rotary actuator fixedly coupled to the upper frame; a driven member fixedly coupled to, and configured to rotate, the drum; a driving member coupled to the rotary actuator and the driven member. The rotary actuator is pivotable with the upper frame relative to the lower frame such that the rotary actuator can cause rotation of the drum irrespective of a position of the upper frame relative to the lower frame.

Optionally, in some embodiments, the solid waste processing system includes a flexible member. The driven member and the driving member are coupled to one another by the flexible member such that the flexible member causes the rotation of the drum via the driven member.

Optionally, in some embodiments, the solid waste processing system the flexible member includes at least one of a chain, a roller chain, a v-belt, or a gear belt.

Optionally, in some embodiments, the driven member and the driving member each comprise at least one of a sprocket, a gear, or a pulley.

Optionally, in some embodiments, the solid waste processing includes a carriage coupled to the upper frame and supports at least a portion of the drive system.

Optionally, in some embodiments, the carriage is disposed below the drum.

Optionally, in some embodiments, the carriage is nested within the lower frame.

Optionally, in some embodiments, the rotary actuator and the driving member are supported on the carriage.

Optionally, in some embodiments, the rotary actuator comprises at least one of an engine, a motor, a gearbox, a transmission, or a variable frequency drive.

Optionally, in some embodiments, the drive system is reversible.

Optionally, in some embodiments, the solid waste processing system includes a plurality of self-aligning trunnions. The drum is rotationally supported on the upper frame by the plurality of self-aligning trunnions.

Optionally, in some embodiments, at least one of the self-aligning trunnions is a radial trunnion.

Optionally, in some embodiments, at least one of the self-aligning trunnions is a thrust trunnion.

A rotatable drum system is disclosed where a drum is rotationally supported on an upper frame by one or more trunnions. A driven member may be coupled and configured to rotate the drum; a flexible member may be configured to engage the driven member; and a driving member coupled to the actuator and may be configured to rotationally drive the flexible member such that the flexible member causes a rotation of the drum via the driven member. The actuator is pivotable with the upper frame relative to the lower frame such that the actuator can cause the rotation of the drum irrespective of a position of the upper frame relative to the lower frame.

Optionally, in some embodiments, the rotatable drum system includes a plurality of self-aligning trunnions. The drum is rotationally supported on the upper frame by the plurality of self-aligning trunnions.

Optionally, in some embodiments, the flexible member includes at least one of a chain, a roller chain, a v-belt, or a gear belt; and the driven member and the driving member each include at least one of a sprocket, a gear, or a pulley.

A method processing municipal solid waste is disclosed. In one embodiment, the method includes rotating a drum;

causing the drum to receive the municipal solid waste, wherein the rotation of the drum converts the municipal solid waste into processed municipal solid waste; tilting the drum to affect a characteristic of the processed municipal solid waste. The characteristic includes at least one of a throughput or a particle size of the processed municipal solid waste.

Optionally, in some embodiments, the drum includes an inlet configured to receive the municipal solid waste, and an outlet both configured to expel the processed municipal solid waste; the drum is rotationally supported on an upper frame; an upper frame is pivotally coupled to a lower frame, to enable the tilting of the drum; the lower frame is configured to be disposed on a support surface; and a drive system is coupled to, and movable with, the upper frame relative to the lower frame and configured to cause the rotation of the drum.

In addition, a trunnion assembly is disclosed. In one embodiment, the trunnion assembly includes a base; a first axle pivotally coupled to the base; and a rocker pivotally coupled to the base via the first axle. The rocker is pivotable relative to the base about the first axle. A second axle is rotationally coupled to the rocker. A roller is rotationally coupled to the rocker via the second axle, and configured to support a rotating load. The first axle is substantially perpendicular to the second axle such that a pivotable motion of the rocker automatically aligns the roller with the rotating load.

Optionally, in some embodiments, the trunnion assembly includes an angular adjustment mechanism lockably coupled to the base and configured to fix a pivotal position of the rocker relative to the base.

Optionally, in some embodiments, the trunnion assembly includes a lubricator configured to lubricate the roller as the roller as the roller rotates about the second axle.

Optionally, in some embodiments, the second axle is substantially aligned with a rotational axis of the rotating load.

A thrust trunnion assembly is disclosed. In one embodiment, the thrust trunnion assembly includes a frame; a first resilient member coupled to the frame; a carriage resiliently coupled to the frame via the first resilient member and moveable relative to the frame along a first axis; a first axle rotationally coupled to the carriage; and a first roller rotationally coupled to the carriage via the first axle and configured to support a rotating load in a direction along a longitudinal axis of the rotating load.

Optionally in some embodiments, the thrust trunnion assembly includes a second axle coupled to the carriage and a second roller coupled to the carriage via the second axle and configured to further support the rotating load.

Optionally in some embodiments, the rotating load is disposed between the first roller and the second roller.

Optionally in some embodiments, at least one of the first axle or the second axle is tilted with respect to a rotational axis of the rotating load.

Optionally in some embodiments, the thrust trunnion assembly includes a second resilient member coupled to the frame at a location opposite from the first resilient member.

A solid waste processing system is disclosed. In one embodiment the solid waste processing system includes a lower frame configured to be disposed on a support surface; an upper frame pivotally coupled to the lower frame; and a drum rotationally supported on the upper frame by one or more self-aligning trunnions. The drum includes an inlet and an outlet both configured to receive solid waste.

Optionally in some embodiments, the one or more self-aligning trunnions is a radial trunnion.

Optionally in some embodiments, the radial trunnion includes a base; a first axle pivotally coupled to the base; and a rocker pivotally coupled to the base via the first axle. The rocker is pivotable relative to the base about the first axle. A second axle is rotationally coupled to the rocker. A roller is rotationally coupled to the rocker via the second axle, and configured to support a rotating load. The first axle is substantially perpendicular to the second axle such that a pivotable motion of the rocker automatically aligns the roller with the rotating load.

Optionally in some embodiments, an angular adjustment mechanism is lockably coupled to the base and configured to fix a pivotal position of the rocker relative to the base.

Optionally in some embodiments, the second axle is substantially aligned with a rotational axis of the rotating load.

Optionally in some embodiments, the one or more self-aligning trunnions is a thrust trunnion.

Optionally in some embodiments, the solid waste processing system includes a frame; a first resilient member coupled to the frame; a carriage resiliently coupled to the frame via the first resilient member and moveable relative to the frame along a first axis; an axle rotationally coupled to the carriage; and a first roller rotationally coupled to the carriage via the axle and configured to support a rotating load in a direction along a longitudinal axis of the rotating load.

Optionally in some embodiments, the solid waste processing system includes a second axle coupled to the carriage and a second roller coupled to the carriage via the second axle and configured to further support the rotating load.

Optionally in some embodiments, the solid waste processing system includes a second resilient member coupled to the frame at a location opposite from the first resilient member.

Optionally in some embodiments, the solid waste processing system includes a driven member coupled to, and configured to rotate, the drum; a flexible member configured to engage the driven member; a rotary actuator; a driving member coupled to the rotary actuator and configured to rotationally drive the flexible member such that the flexible member causes a rotation of the drum via the driven member. The rotary actuator is pivotable with the upper frame relative to the lower frame such that the rotary actuator can cause the rotation of the drum irrespective of a position of the upper frame relative to the lower frame.

Optionally in some embodiments, the solid waste processing system includes a lift mechanism fixedly coupled to the lower frame and the upper frame and configured to elevate an end portion of the drum proximate to the inlet relative to the outlet.

BRIEF DESCRIPTION OF THE DRAWINGS

FIG. 1I shows the pivoting device and a pivot pin of the carrier frame, according to the present disclosure.

DETAILED DESCRIPTION

Figure 1A:
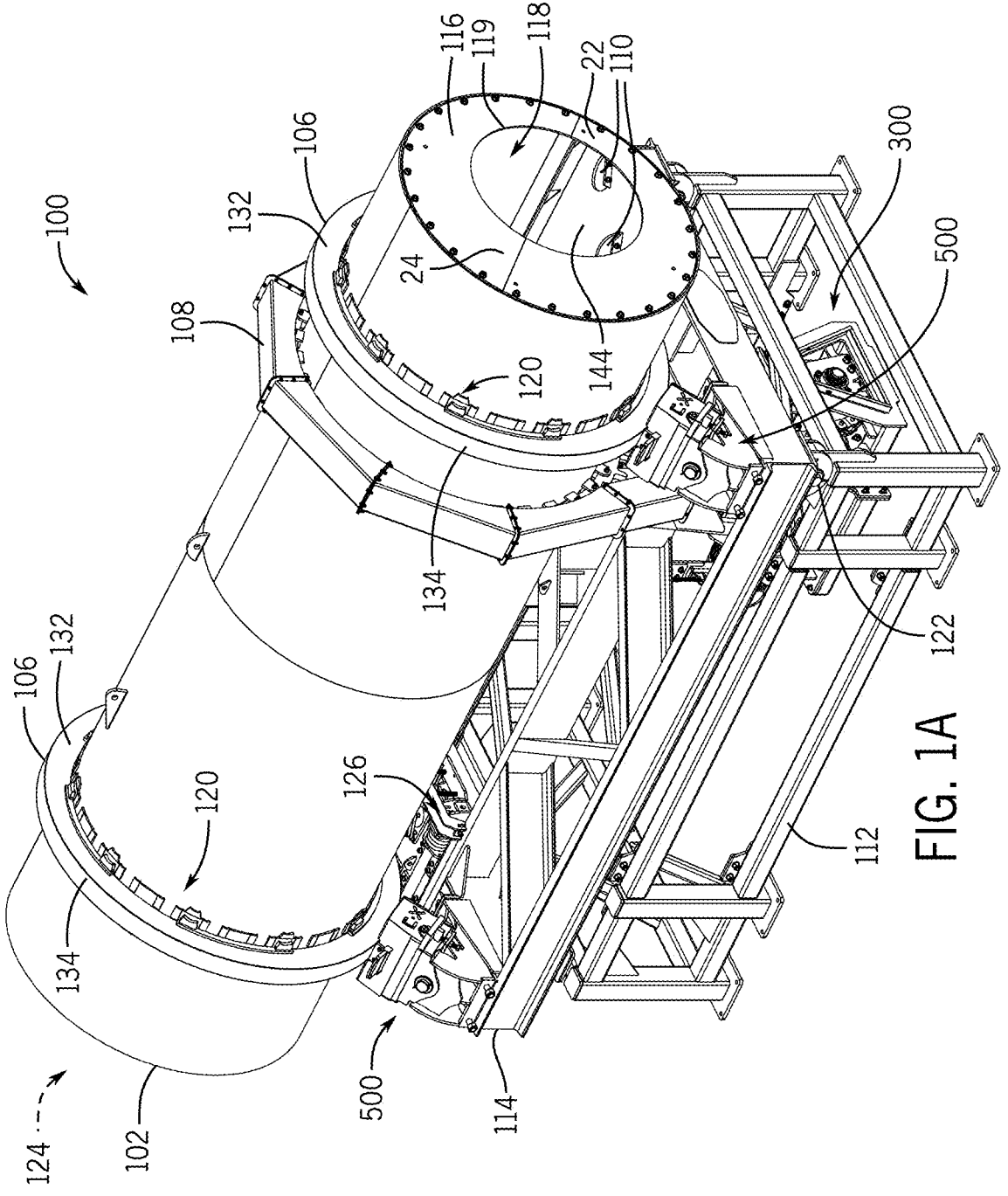
FIG. 1A is a perspective view of a waste processing system including a rotatable drum having a longitudinal axis according to the present disclosure.

The present disclosure provides for systems and methods of providing drive systems, that may be used in operating a rotatable drum system, and related components and subsystems, e.g., radial trunnions and thrust trunnions. The systems and methods may be used in connection with processing materials using a rotatable drum system. Such materials may include municipal solid waste ("MSW"). In one embodiment, the rotatable drum with a drive system according to the present disclosure may be configured as a solid waste processing system. The solid waste processing system may be adapted for processing MSW, in particular fibrous waste, by self-attrition. As used herein, MSW may include any solid waste, whether from a municipal source (e.g., residential trash, recycling, etc.) or from commercial or industrial sources (e.g., stores, warehouses, or factories, etc.). In many embodiments, the solid waste processing system is adapted to process fibrous MSW containing cellulose, wood fibers, paper fibers, or the like. However, other embodiments may be adapted to process other types of MSW such as steel, aluminum, plastic, compostable waste, etc.

Systems and methods hydrate and condition a stream of municipal mixed solid waste (MSW) for use in separation of drenched and hydrated MSW into one or more recyclable and/or recoverable (e.g., organics) streams for the reduction the overall volume of waste that reaches landfills or incinerators. MSW streams contain a mixture of organic, recyclable and non-recyclable materials (e.g., materials that will eventually be sent to a landfill or incinerated). Organics include fruits and vegetables, meat, eggs, eggshells, grains, beans, dairy products, bones (bone meal), paper products (e.g., waxed cardboard, food boxes, napkins, paper towels, paper plates, milk cartons, tea bags, coffee grounds and filters, parchment and waxed papers), hair (pet hair), yard waste, plant and flowers, and so on. Organic materials may also be compostable and biodegradable. Organic materials typically account for 40 to 65 wt % of MSW. Recyclable materials include plastic, glass, metals (e.g., iron and aluminum) and some paper products (e.g., corrugated cardboard). Other materials in the waste stream such as construction materials, concrete, foam, rubber, diapers, and so on, are commonly disposed of in landfills or incinerators, e.g., these materials pass through the waste processing plant without having been separated in the streams of recyclable and organic materials.

When provided as a solid waste processing system, the rotating drum receives MSW. As the drum rotates, the MSW is broken into smaller pieces suitable for re-processing into recycled finished goods. The drum may be tilted at an angle relative to the support surface on which the solid waste processing system is placed. Such tilt can help control the movement of MSW through the drum, the processing rate of the solid waste processing system, the size of the processed MSW material particles exiting the solid waste processing system, or other aspects of the operation of the solid waste processing system. The rotatable drum system may be configured similarly for use in other operations such as industrial processing of heavy loads (e.g., about 10-15 tons). The rotatable drum system may be useful in other applications with a tilted or horizontal rotating load, such as dryer kilns, ball mills, screened trommels, concrete trucks, etc.

According to implementations of the present disclosure, methods and systems provide a waste processing system having a rotatable drum for receiving a mixture of MSW and water and for processing and conditioning the waste using agitation and pulverization for breaking apart the MSW as water hydrates the hydratable waste, e.g., the organics in the MSW. The processed, hydrated mixture exits the rotating drum for further downstream processing to separate the waste stream into various recyclable fractions, e.g., by downstream screening and/or shaking processes and/or density separation processes.

Figure 1B:
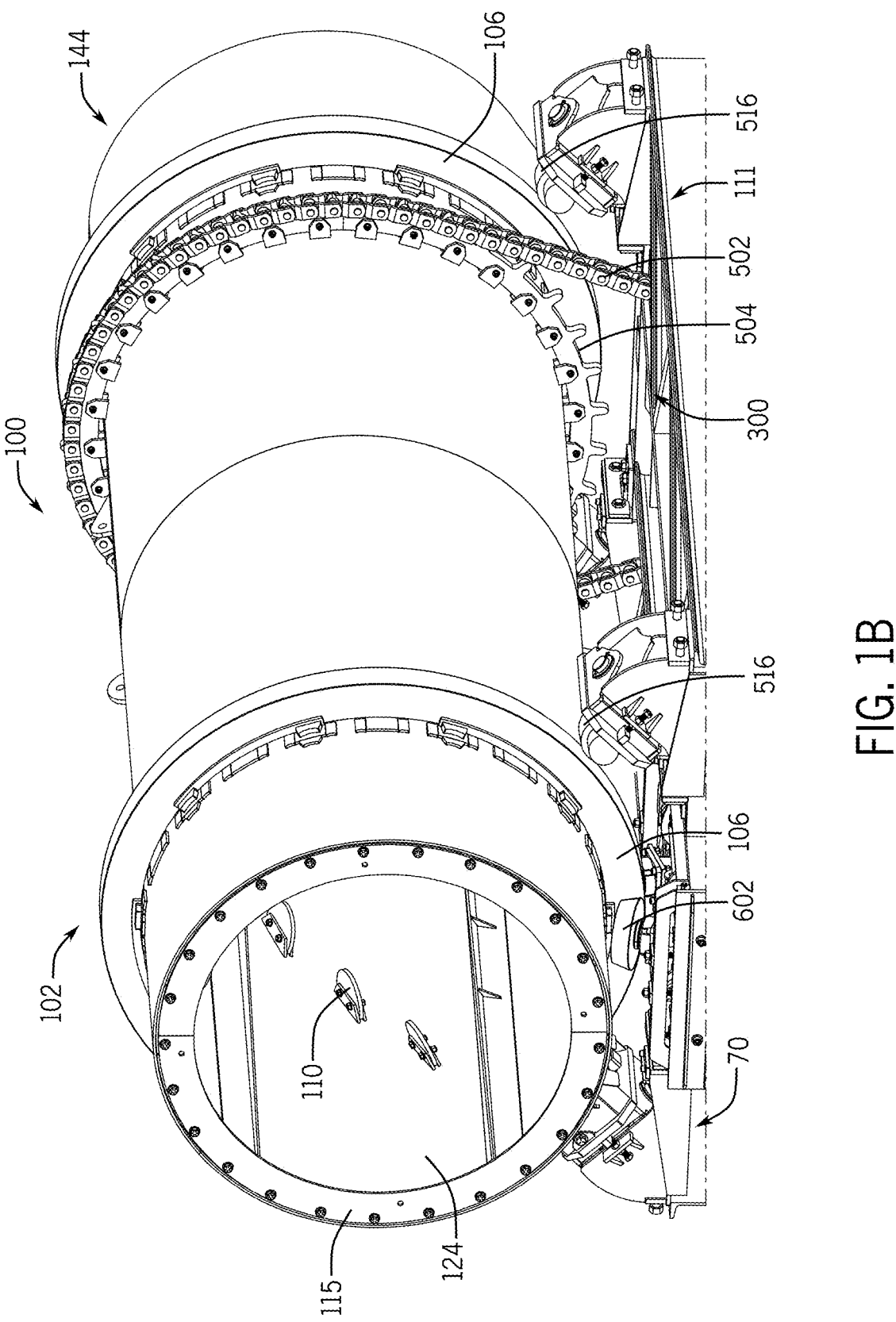
FIG. 1B is a side elevation view of the rotatable drum of FIG. 1A.
Figure 1C:
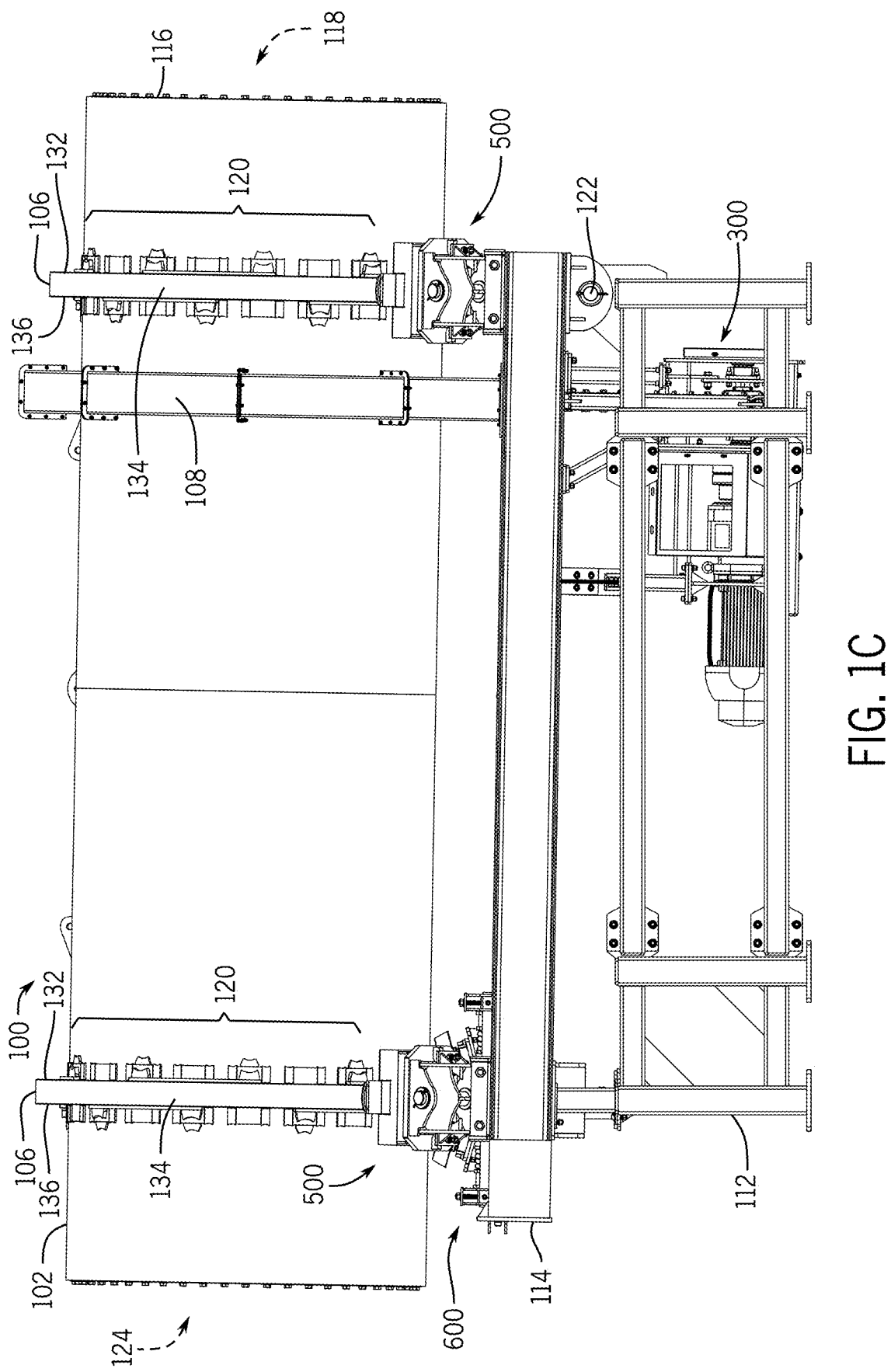
FIG. 1C is a side elevation view of the rotatable drum system of FIG. 1A in a first configuration.
Figure 1D:
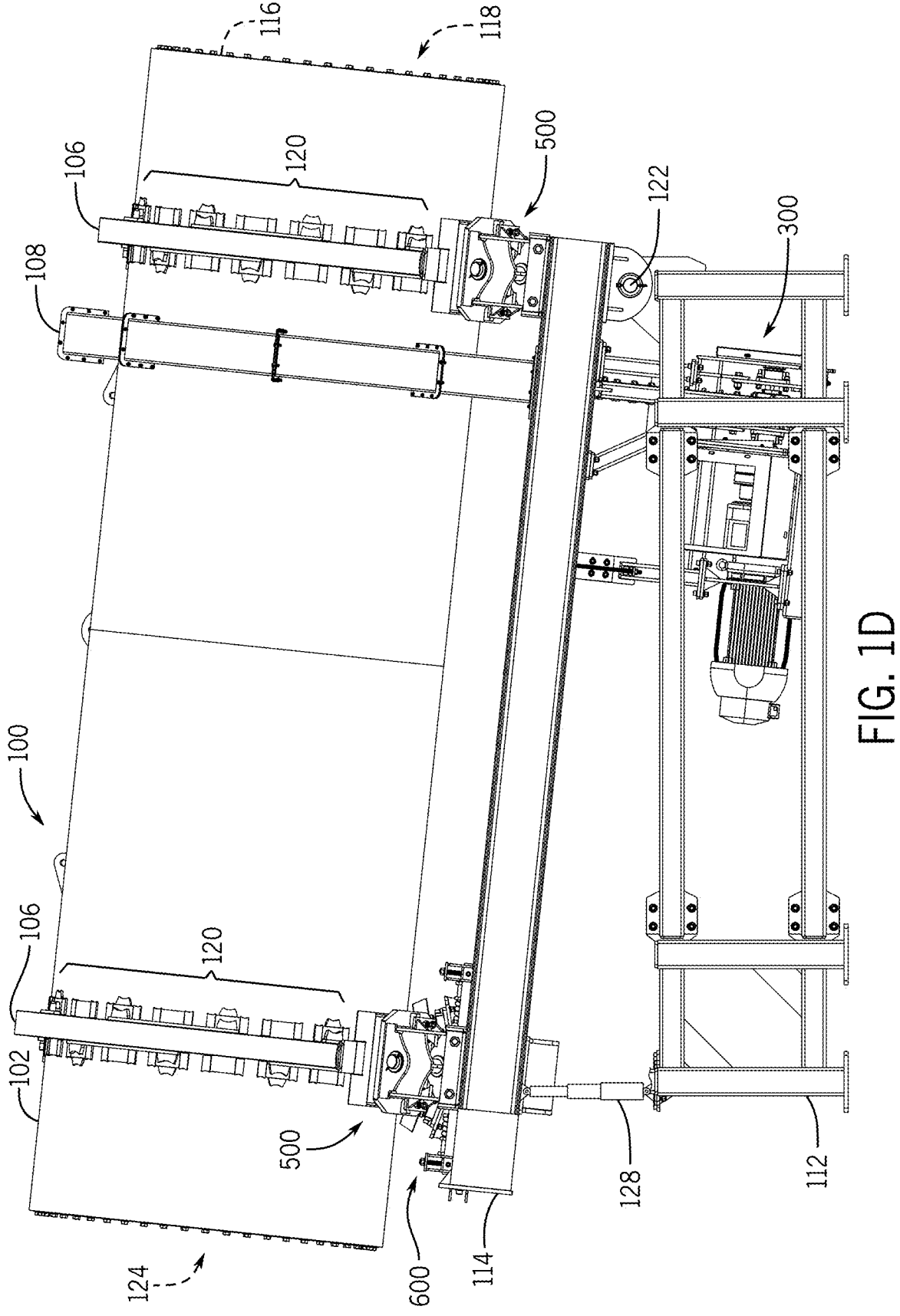
FIG. 1D is a perspective view of the rotatable drum system of FIG. 1A in a second configuration.

Turning to the Figures, FIGS. 1A and 1B illustrate waste processing system 100 also referred to as a rotatable drum system 100 including a rotatable drum 102 having a longitudinal axis with an eccentric opening 119, paddles or blades 110, lifters 40, a drive system 300, a carrier frame 111, and a pivoting device 70, according to the present disclosure.

The drum 102 may include an ingress or inlet aperture 124 and an egress 144, and may define a substantially enclosed interior therebetween, for instance using jacketed sidewalls, such that the ingress or inlet aperture 124 and egress 144 provide the entrance and exit, respectively, for the passage of a mixture of MSW and water. The drum 102 may be cylindrically shaped, may be about 20 to 60 feet long, such as about 24 feet long, and may have a diameter of about 50 in. to about 148 in., such as about 86-88 in., or about 86, 87, or 88 in. The drum interior, as provided herein, may use paddles, lifters, and combinations, to agitate the mixture.

As shown in FIG. 1B, the ingress or inlet aperture 124 of the drum 102 may be defined by the drum 102 or optionally by a removably attached proximal end cap 115 configured as an open ring. The end cap 115 may include an outer diameter corresponding to the outer diameter of the drum 102, and an inner diameter may be about 4 in. to about 20 in. shorter than the outer diameter. For instance, where the drum has a diameter of about 87 in., the end cap 115 may have an inner diameter defining the opening that is about 50 in. to about rollers 602 in., or about 70-85 in., or about 72 in. A longitudinal axis of the end cap 115 may be aligned with the longitudinal axis of the drum 102.

As shown in FIG. 1A, the egress 144 of the drum 102 may be defined by a distal end forming an outlet aperture 118 configured with an eccentric opening 119, which may be removably attached to the drum 102. The eccentric opening 119 of the end cap 116 may have a longitudinal axis that is offset from the longitudinal axis of the drum 102, such as by about 6 in to 12 in, or about 8 in., center-to-center distance. The eccentric opening 119 may have a diameter of about 30 in. to about 60 in., such as a diameter of about 50 in. Although the eccentric opening 119 is shown as a circle in FIG. 1A, the eccentric opening 119 may include a variety of shapes such as oval, polygon, and so on. The eccentric opening 119 may be defined by the end cap 116 such that the end cap 116 forms a first wall portion 22 having a height that is shorter than a second wall portion 24 of the end cap. As shown in FIG. 1A, the first wall portion 22 forms a portion of the eccentric opening 119 that is closer to the drum sidewall perimeter relative to the second wall portion 24, such as about 6 to 12 in., or about 8 in. closer to the drum sidewall perimeter. As provided herein, the configuration of the distal end cap 116 and the eccentric opening 119 may retain the mixture of water and MSW within the drum 102 until a level of the mixture exceeds the height of the first wall portion 22. For instance, the second wall portion 24 of the distal end cap 116 may retain the mixture within the drum 102 during rotation, and when the first wall portion 22 reaches a lower rotational position, the portion of the mixture exceeding the height of the first wall portion 22 at the egress 144 may then be permitted to exit the eccentric opening 119 at the first wall portion 22. When the first wall portion 22 reaches a high rotational position, the second wall portion 24 may again retain the mixture in the drum, to thereby facilitate a continuous batch flow of the mixture from the drum 102. In addition to the end caps 16, and 18 of the drum 102 facilitating retention of the mixture within the drum 102, the drum 102 additionally include seals between the proximal and distal terminal ends of the drum 102 and respective end caps 16, 18 to provide a fluid tight structure. In addition, the drum 102 may be free of screens, such as trommel screens.

Figure 1E:
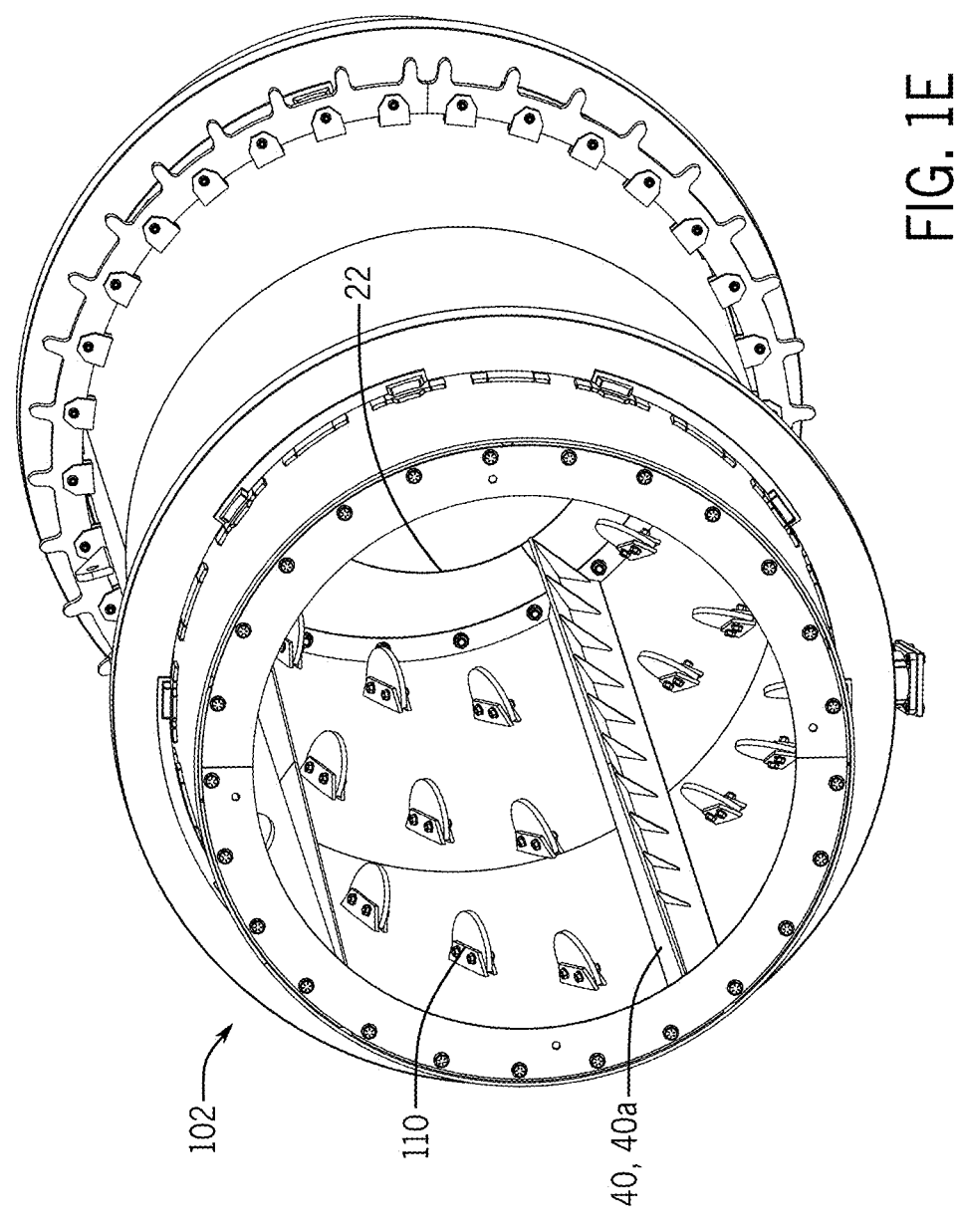
FIG. 1E illustrates the rotatable drum of FIG. 1A with paddles arranged in a helical pattern, according to the present disclosure.

A plurality of paddles or blades 110 may be joined to an interior of the drum 102. The paddles or blades 110 may be semi-circle shaped (FIG. 1G) and may be fixed the interior of the drum 102 using fasteners such as by bolts and screws or by welding. The paddles may be about 6 to 18 in. long, 4 to 12 in deep. Although the paddle 30 of FIG. 1E is shown has having a 2/3 circle shape, the paddles or blades 110 may have other shapes that facilitate agitation and urging the mixture to locations within the drum 102, such as towards the ingress or inlet aperture 124, towards the egress 144, or towards a middle portion of the drum. For instance, the paddle 30 may have an oval, a scalloped, jagged, wavy, or squared-off shape.

As shown in FIG. 1E, the paddles or blades 110 may be helically arranged around the central axis of the drum 102. In one example, the drum 102 may include about 30 to 60 paddles, such as about 45 paddles, and the paddles or blades 110 may be equally spaced apart. In some implementations, two or more paddles may be joined to one another. In addition or alternatively, paddles or blades 110 may be joined to the lifters 40 provided herein.

In some implementations, the paddles or blades 110 may be arranged angularly offset from the longitudinal axis of the drum 102. The paddles or blades 110 may be joined to the drum at about 10 to about 45 degrees, about 10 to 30 degrees, or about 20 degrees offset from the longitudinal axis of the drum 102.

The paddles or blades 110 may be carried by the drum 102 during rotation resulting in the paddles or blades 110 urging the mixture towards the ingress or inlet aperture 124 of the drum 102 to facilitate increased retention time of the mixture. For instance, the angular arrangement may enable the paddles or blades 110 to push the mixture towards the ingress or inlet aperture 124. In addition or alternatively, the paddles or blades 110 may be angularly arranged to decrease retention time of the mixture, and may be arranged to push the mixture towards the egress 144. Further, some paddles or blades 110 may be arranged to increase retention time, while other paddles may be arranged to decrease retention time. In another example, the paddles or blades 110 may be arranged to urge the mixture towards a middle portion of the drum 102. For instance some paddles proximate the ingress or inlet aperture 124 may urge the mixture towards the egress of the drum 102, while paddles proximate the egress 144 may urge the mixture towards the ingress or inlet aperture 124, which may result in the mixture being urged towards a middle portion of the drum 102.

Although the paddles or blades 110 are shown as having a spaced-apart helical pattern within the drum 102, the paddles or blades 110 may have other arrangements for facilitating retention time of the mixture, such as a circular patterns, semi-circular patterns, and the arrangements may be spaced throughout the drum 102, such as equally spaced, or a majority of the paddles or blades 110 may be provided proximate the ingress or inlet aperture 124, in a middle portion of the drum 102, or proximate the egress 144 of the drum 102.

A plurality of lifters 40 may be joined to the interior of the drum 102. The lifters 40 may have a length that extends continuously along the longitudinal axis of the drum 102 from the ingress or inlet aperture 124 to the egress 144 and have a width that extends radially towards the longitudinal axis of the drum 102. During the rotation of the drum 102, the lifters 40 may agitate the mixture by lifting the mixture within drum 102. The lifters 40 may include gusseting to support the structural integrity of the lifters 40 during agitation of the mixture, which may contain dense and heavy MSW components.

As shown in FIG. 1E, at least one of the lifters 40a may be positioned at, and arranged perpendicular to the first wall portion 22 of the end cap 116. A width of such lifter 40a at the first wall portion 22 may correspond to a height of the first wall portion 22, e.g., about 4 to 10 in., or about 8 inches, which may result in the portion of the lifter 40a at the egress 144 guiding the mixture out of the drum 102. In addition, lifter 40a may have a width that changes between the ingress or inlet aperture 124 and the egress 144 of the drum 102. For instance, the lifter 40*a* may widen to correspond to the height of the end cap 116 at the first wall portion 22, e.g., where the width of the lifter 40*a* is 6 in. at the ingress or inlet aperture 124 of the drum 102, and a height of the end cap at the first wall portion 22 is 8 in., the width of the lifter 40*a* may gradually increase from 6 to 8 in. to match the height of the first wall portion 22.

Figure 1F:
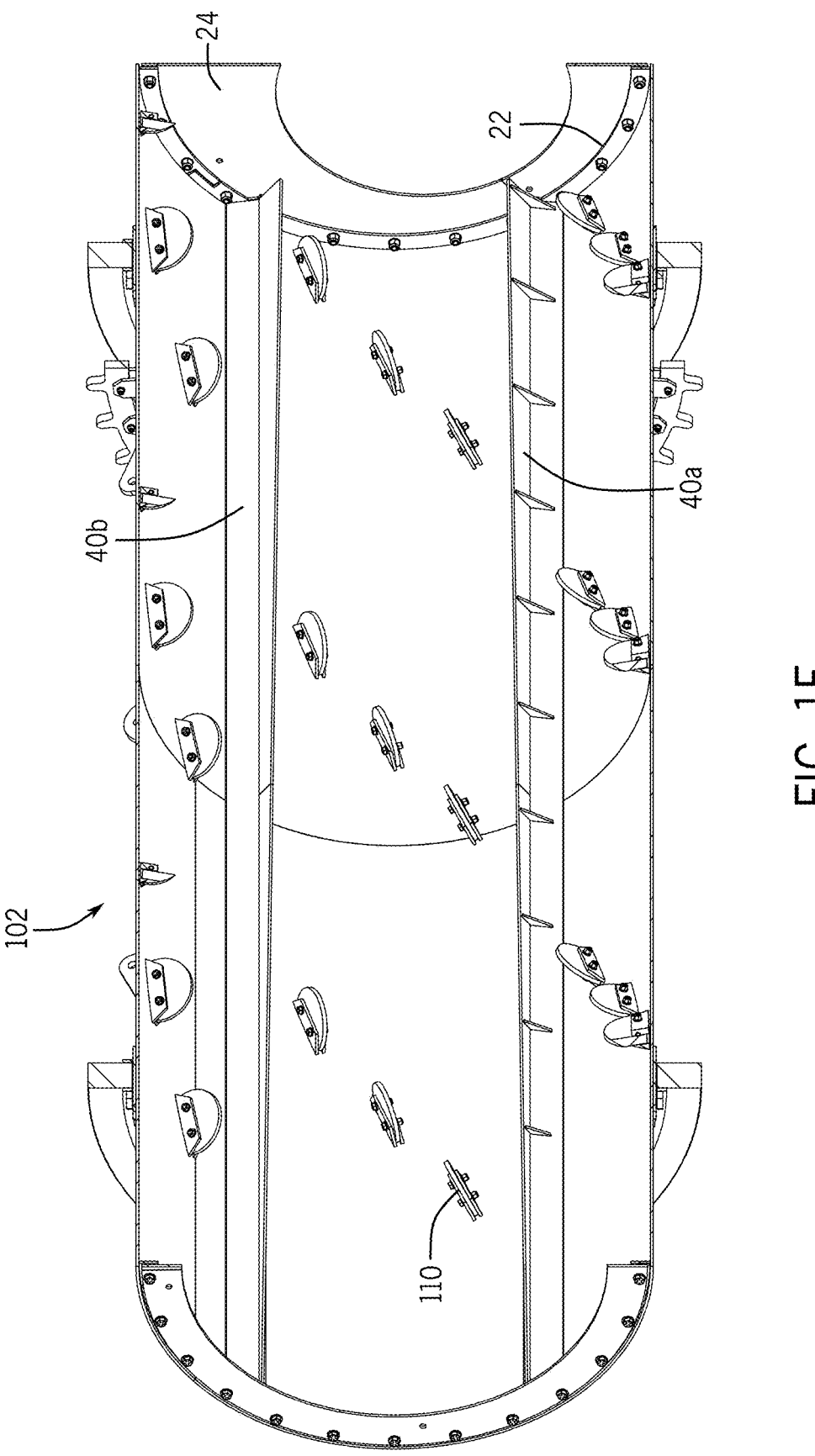
FIG. 1F illustrates a cross-sectional view of the drum of FIG. 1A including lifters and positions of such lifters relative to the end cap, according to the present disclosure.
Figure 1G:
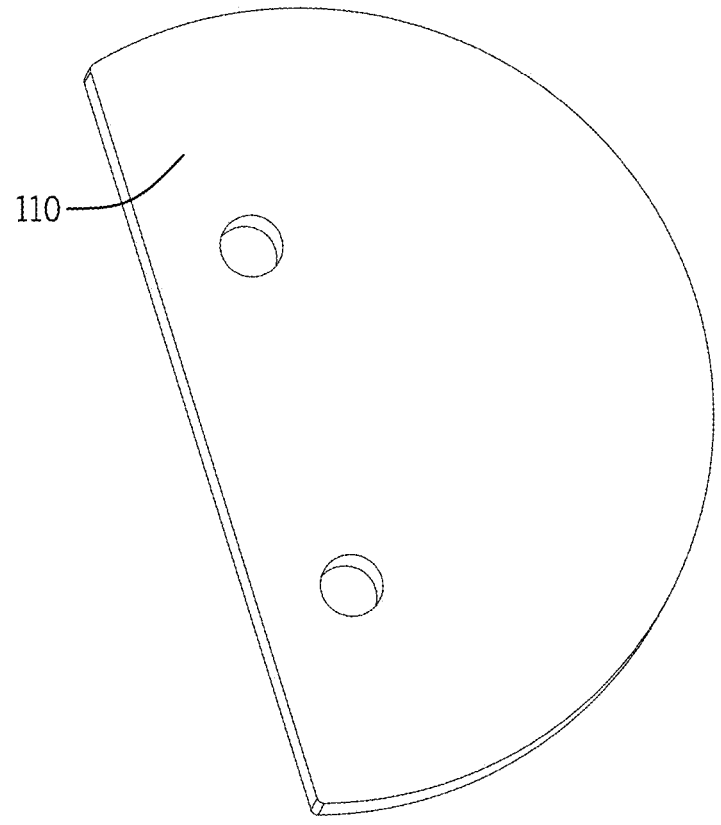
FIG. 1G illustrates a front isometric view of a paddle, according to the present disclosure.

As shown in the cross-sectional view of the drum 102 in FIG. 1F, another of the lifters 40*b* may be positioned at, and arranged perpendicular to the second wall portion 24 of the end cap 116. A width of this other lifter 40*b* at the second wall portion 24 may be shorter than a height of the second wall portion 24, which may result in the portion of the lifter 40*b* at the egress 144 retaining the mixture within the drum 102. The lifer 40*b* may also include a width that gradually changes between the ingress or inlet aperture 124 and egress 144, however, the width of the lifter at the second wall portion 24 may continue to be smaller than a height of the second wall portion 24.

Figure 1H:
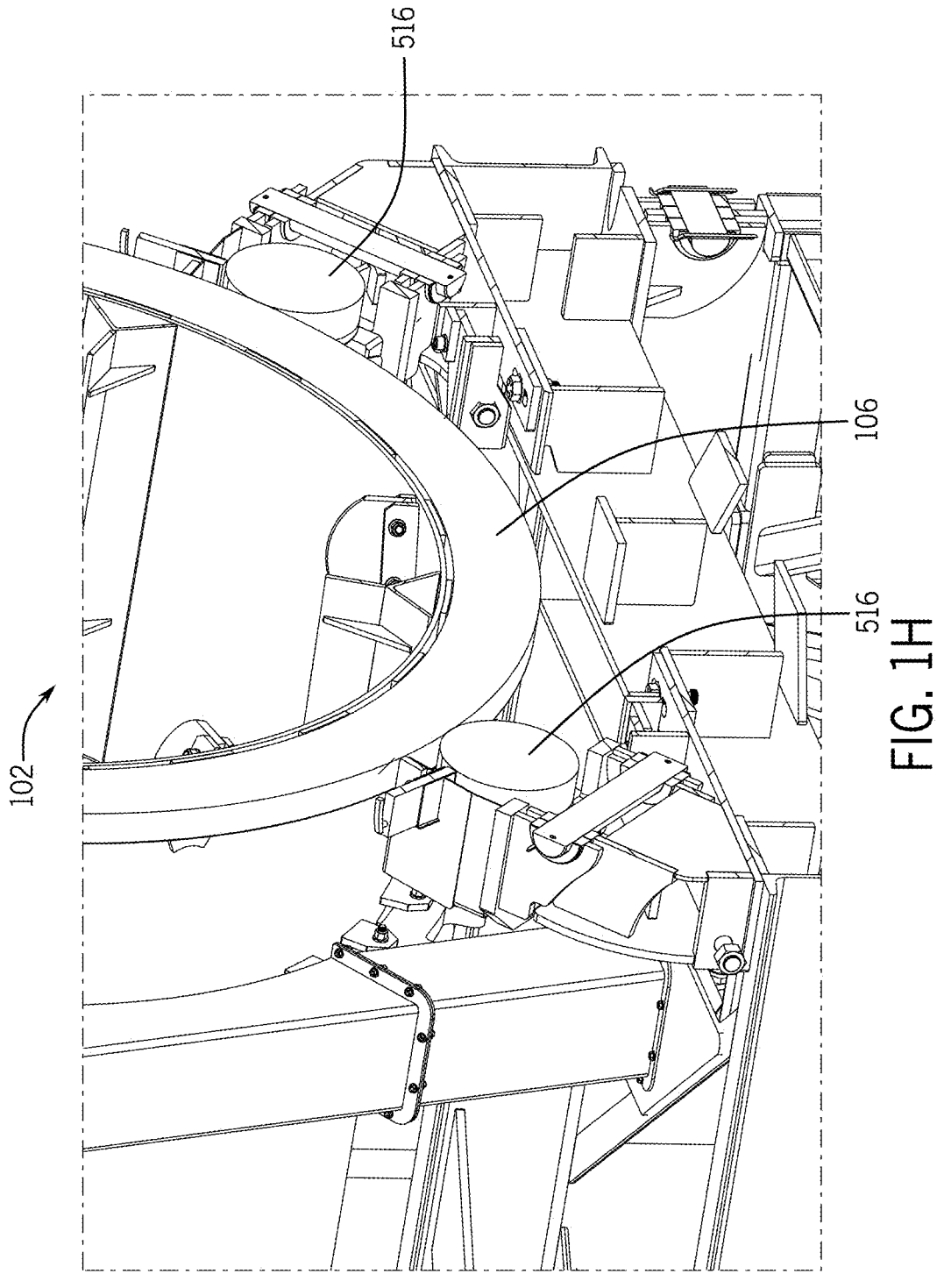
FIG. 1H illustrates a cross-sectional view of the rotatable drum and a pair of rollers for rotationally supporting the tire of the rotatable drum, according to the present disclosure.

Returning to FIG. 1B, a drive system 300 of the waste processing system 100 may rotate the drum 102. In some implementations, the drive system 300 may include a chain drive or flexible element 502 coupled to a drive sprocket that drives the drum sprocket or driven member 504, although other drive devices are within the scope of this disclosure. The drive system 300 may rotate the drum 102 at a rate of about 2 to about 20 revolutions per minute (rpm), or at a rate of about 8 to about 16 rpm. The exterior circumference of the drum 102 may include at least two drum tires 106 received by pairs of rollers 516 supported by a carrier frame 111 of the waste processing system 100, where each of the pairs of rollers 516 are oriented radially to the drum 102 and arranged at the proximal and distal ends of the drum 102 to permit free rotation of the drum 102 as the drive system 300 operates. FIG. 1H illustrates a cross-sectional view of the drum 102 and a pair of rollers 516 for rotationally supporting the tire 106 of the drum 102.

A pivoting device 70 of the waste processing system 100 may pivot the drum 102 about the longitudinal axis of the drum 102 from about 0 to 25 degrees, about 0 to about 15 degrees, about 0 to about 10 degrees, about 0 to about 5 degrees, about 0.5 to about 10 degrees, about 1 to about 5 degrees, about 3 to about 7 degrees, about 2 to about 8 degrees, or about 5 degrees, where 0 degrees corresponds to the longitudinal axis of the drum 102 being parallel to the ground. Pivoting the angle of the drum 102 may adjust a rate of passage of the mixture through the drum 102 and out of the egress 144 of the first wall portion 22 of the end cap 116 as the drum 102 rotates. The pivoting device 70 may be configured as a hydraulic, pneumatic, mechanical device, such as a jack, and the pivoting device may raise and lower the drum 102 at its proximal end or at its distal end. In FIG. 1B, the pivoting device 70 is arranged at the proximal end of the drum 102 such that the drum ingress or inlet aperture 124 may be raised relative to the drum egress 144, however the pivoting device 70 may alternatively be arranged at the distal end of the drum 102. The carrier frame 111 supporting the drum 102 may include a hinge at an end opposite from where the pivoting device 70 is positioned to facilitate operation of the pivoting device 70 in pivoting the drum 102.

Figure 11:
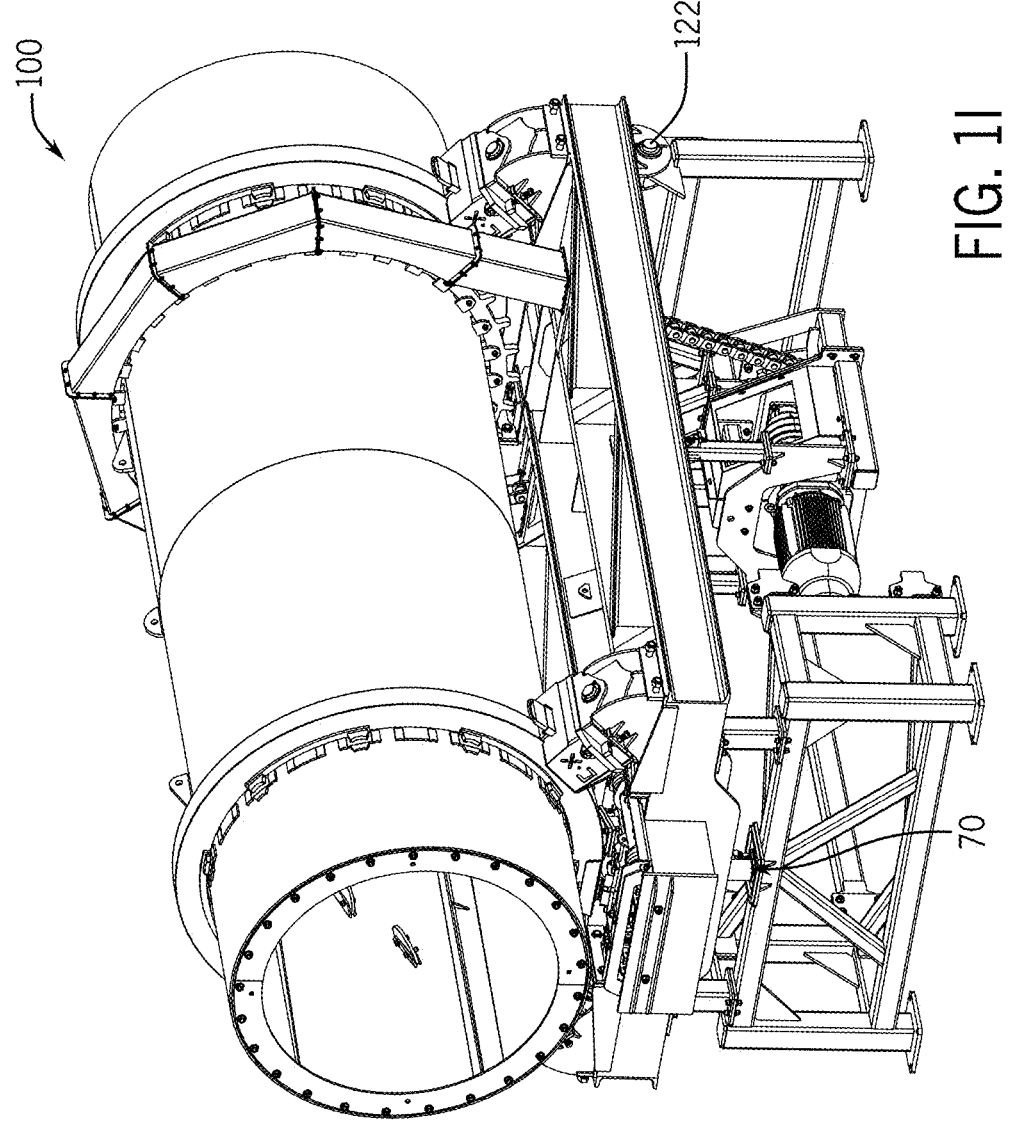

According to the present disclosure, the carrier frame 111 of the waste processing system 100 may support both the drum 102 and the drive system 300, and as the pivoting device 70 pivots the carrier frame 111, the drum 102 and the drive system 300 may be carried by the carrier frame 111 and be caused to pivot together. FIG. 11 shows the pivoting device 70 and a pivot 122 of the carrier frame 111 proximate a distal end of the carrier frame 111. The carrier frame 111 may include a pair of trunnion wheels rollers 602 (FIGS. 1B and 6A) for supporting opposing sides of the drum tire 106 proximate the pivoting device 70. The trunnion wheels rollers 602 may be positioned at about 45 degrees offset from vertical to facilitate rotation of the drum 102 while the drum is in a pivoted position. For instance, the trunnion wheels rollers 602 may contact the tire 106, and as the drive system 300 causes the drum to rotate, and the pivoting device 70 pivots the drum 102, the trunnion wheels rollers 602 may support the tire 106 in rotation, driving is via a chain drive and gear box motor, pinion and drive sprocket driven by train. Further aspects of the pivoting device 70 are described in connection with the lift mechanism 128 as well as other features thereof. Further aspects of the drive system 300 are described herein at least in connection with FIGS. 3A-3E and 4.

Figure 2:
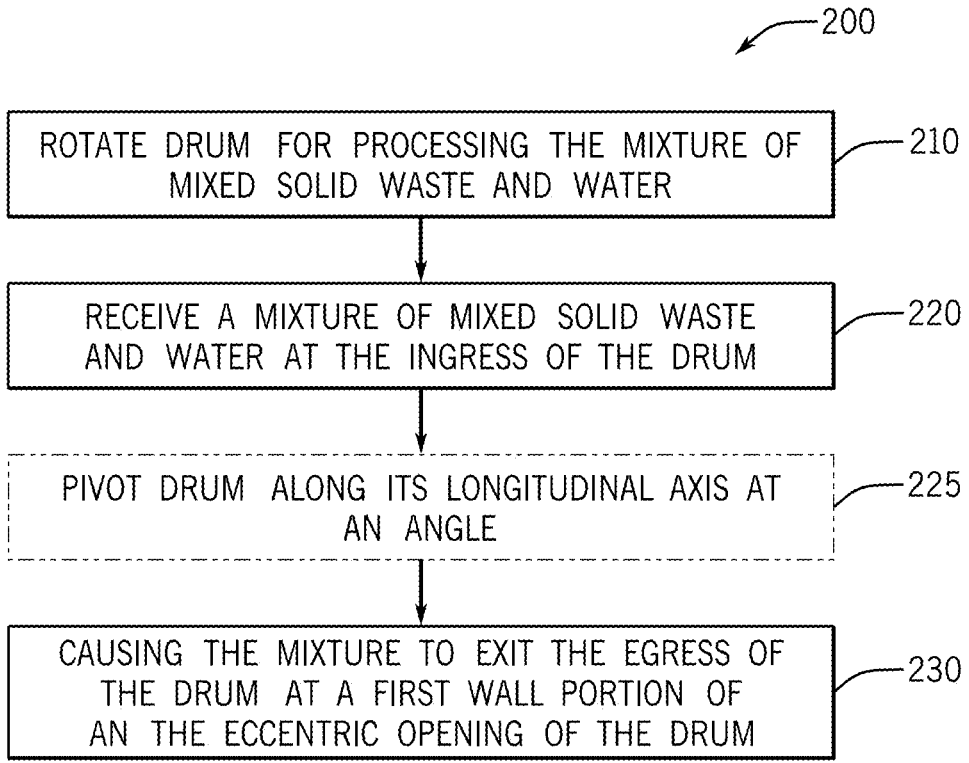
FIG. 2 depicts a flowchart of a method for processing a mixture of MSW and water in the rotatable drum, according to the present disclosure.

In use, and turning to FIG. 2, depicted is a flowchart of a method 200 for using the waste processing system 100 for processing a mixture of MSW and water in the drum 102, according to the present disclosure. Turning to method 200, the drum 102 may be rotated in operation 210 for use in processing the mixture of MSW and water by agitation, pulverization and hydration over a treatment period during which the MSW resides in the rotatable drum 102. The drum 102 may be rotated about its longitudinal axis by, for instance, the drive system 300 disclosed herein.

In operation 220, a mixture of MSW and water may be received at the ingress or inlet aperture 124 of the drum 102 via the opening defined in the proximal open end cap 115. For instance, the mixture or portions thereof may be dropped and/or conveyed into the ingress or inlet aperture 124 of the drum 102. The receipt of the mixture in operation 220 may be continuous, e.g., in a continuous waste processing operation. Alternatively, the receipt of the mixture may be in batches, or a combination of continuous and batch delivery.

In some implementations, prior to the mixture being received at the ingress or inlet aperture 124 of the drum 102 in operation 220, the MSW stream may be held in bags such as plastic or paper garbage bags that require opening prior to proceeding with operation 220. For instance, bag splitters may pierce the bags to cause the waste held therein to exit such bags. In some implementations, the bag splitters may operate using jetted water nozzles, which may result in partial hydration of the MSW as the bags are pierced by the water and the MSW is released and begins to be hydrated. Bag openers using jetted water stream are disclosed in co-pending U.S. patent application Ser. No. 17/401,497, filed on Aug. 13, 2021, which is incorporated by reference herein in its entirety for any useful purpose. In such implementations, the water from the jetted nozzles and the MSW may be delivered to the ingress or inlet aperture 124 of the drum 102. For instance, water from such bag splitters may be delivered at a rate of 50 to 200 gallons per minute (gpm), or about 50 to 150 gpm, about 100 gpm, about 125 gpm, 150 gpm, and the mixture may be funneled into the ingress or inlet aperture 124 of the drum 102. However, it will be appreciated that the mixture of MSW and water may be provided to the drum ingress or inlet aperture 124 in operation 220 in a variety of ways. For instance, the MSW and water may be delivered separately to the ingress or inlet aperture 124. Dry or partially wetted MSW may be conveyed or dropped into the ingress or inlet aperture 124. A water pump may supply water to the ingress or inlet aperture 124 at the aforementioned rates, or the water pump may supply supplemental water to a partially hydrated mixed waste stream, such as about 10 to 75 gpm, or about 25 gpm, and the supplemental water may be fresh or recycled.

Upon receipt of the MSW and water in the rotating drum 102 in operation 220, the mixture may be agitated therein. The MSW may for instance be agitated by lifting the MSW using the drum 102 components such as the paddles or blades 110 and lifters 40, and the lifted MSW materials may be carried vertically in the drum 102 and fall into and on the MSW materials at a bottom portion of the drum 102 such that the MSW (e.g., paper, fibers, organic materials) breaks apart into smaller pieces by the larger, heavier MSW materials (e.g., wood, rocks, and other durable or heavy materials). The MSW may be for instance agitated by the angularly arranged paddles or blades 110, which may be angularly offset from the longitudinal axis may urge the mixture towards the ingress or inlet aperture 124 to thereby facilitate retention of the mixture of in the drum 102. For instance, as the drum 102 rotates clockwise, the angularly offset paddles or blades 110 may be arranged in a clockwise, helical fashion and may be angled to urge the mixture towards the ingress or inlet aperture 124 of the drum 102. In addition, the paddles or blades 110 may lift the mixture and cause the mixture to be pulled apart and fall within the drum interior. For instance, the paddles or blades 110 may lift the mixture and carry it as the drum 102 rotates until the angle of the paddle 10 permits the MSW to fall into the drum interior, and may be based on the rotation speed and centripetal force exerted by the drum 102 and the material properties of the MSW. For example, based on the paddle angle, the MSW may be carried by the paddles or blades 110 as the drum 102 rotates by about 30 to about rollers 602 degrees from vertical before falling into the drum interior, such as about 30 to about 120 degrees, about 60 to about lrollers 602 degrees, about 90 to lrollers 602 degrees, about 60 to about 120 degrees, about 90 to about 120 degrees, about rollers 602 to about 130, 140, 150, 160, 170 or lrollers 602 degrees.

Lifters 40 may further agitate the mixture by lifting, pulling apart, and causing the mixture to fall within the drum interior. As the MSW and water continues to be received at the ingress or inlet aperture 124, this may cause the mixture to advance within the drum 102 towards the egress 144. Upon reaching the egress 144, the mixture may be held in the drum 102 by the distal end cap 116 defining the eccentric opening 119 offset from the longitudinal axis of the drum 102.

In operation 230, as a level of the mixture reaches the height of the first wall portion 22, the portion of the mixture at the egress 144 having a height that exceeds the height of the first wall portion 22 exits the eccentric opening 119, e.g., the mixture exits when the first wall portion 22 reaches a lower rotational position in which the first wall portion 22 defines a lowest portion of the egress 144 in a rotational cycle of the drum 102, permitting the mixture exceeding this height to exit. As the first wall portion 22 reaches an upper rotational position and the taller, second wall portion 24 defines the lowest portion of the egress 144 in the rotational cycle of the drum 102, the mixture having a level at or below the height of the second wall portion 24 is retained in the drum 102, which enables the eccentric opening 119 of the drum 102 to control a rate of delivery of the mixture out of the drum 102. This may result in a batched delivery of the mixture, where the number of batches corresponds to the number of revolutions of the drum 102 per minute. More particularly, once a level of the mixture at the egress reaches a height of the first wall portion 22, this mixture is retained by the distal end cap 116, particularly by the second wall portion 24 having a height that exceeds that of the first wall portion 22, and once the first wall portion 22 reaches the lower rotational position and forms the low portion of the egress 144, one batch of the mixture may exit the drum 102 in operation 230. As the drum 102 continues to rotate, another batch of the mixture may exit the drum 102 per each drum revolution.

Method 200 may optionally include operation 225 in which the drum 102 is pivoted along its longitudinal axis at an angle. Angular pivoting may be at a downward angle of about 0.5 to 5 degrees, 0.5 to 10, 0.5 to 15, or any angle between 0 and 25 degrees, where the ingress or inlet aperture 124 is arranged at a higher elevation relative to the egress 144 of the drum 102. Pivoting in this manner may facilitate movement of the mixture from the ingress or inlet aperture 124 towards the egress 144 at a faster rate and causing a larger volume of the mixture to exit in operation 230 compared to processing the mixture in the drum 102 when the longitudinal axis is arranged parallel to the ground.

The receipt of the mixture in operation 220 and exit of the mixture in operation 230 in method 200 may proceed over the course of a treatment period during which the water hydrates the MSW, and for instance the organics in the MSW are hydrated to form a slurry. Accordingly, the initially received mixture in operation 220 may include non-wetted organics in the MSW or partially hydrated (e.g., partially wetted) organics in the MSW, such as 0 to 20 percent hydrated organics, and during processing in the drum 102 over operation 220 and prior to the mixture exiting in operation 230, the mixture may be retained within the drum 102 for a treatment period or dwell time of about 10 to about 120 minutes, such as about 20 to about 30 minutes, during which the organics in the MSW may be saturated to a level of about 70 to about 100 percent prior to exiting in operation 230. During this period, the saturated organics may form a slurry due to the agitation caused by the rotation and mechanical working of the paddles, lifters and the tumbling action of the wetted MSW on itself within the drum. In some implementations, the treatment period or residence time of the mixture may be a pre-defined amount of time during which an amount of water and/or an amount of MSW fed into the ingress or inlet aperture 124 may be adjusted so that a slurry of the mixture exits the egress with little or no excess water, e.g., little or no unabsorbed water. In addition or alternatively, the treatment period may be adjusted by adjusting the residence time of the mixture, such as by adjusting the size of the ingress, adjusting the size of egress, and/or by adjusting an angle of the drum 102 using the pivoting device 70 as disclosed herein in operation 225, and by adjusting an angle of the paddles (e.g., directing the paddle angle towards the ingress may increase residence time, while directing the paddle angle towards the egress may decrease residence time) and/or by adjusting a rotation rate of the drum 102.

In method 200, the drum 102 may be configured to process about 10,000 to about 15,000 lbs. of trash per hour, or about 100 to 200 pounds per minute, along with about 6,000 to 12,000 gallons of water per hour or about 100 to 200 gpm of water.

Following use of the waste processing system 100 in method 200, the slurry of MSW containing hydrated organics may be processed in a waste processing facility, such as a material recovery facility (MRF). It will be appreciated that the operations of 210 to 225 of method 200 may be performed in any order or simultaneously with other operations, and for instance, the operation 220 of receiving MSW and water may precede initiation of operation 210 of rotating the drum 102. In another example, the drum may be pivoted in operation 225 simultaneously with operations 210 and/or 220. Moreover, because method 200 may be a continuous method, operation 230 may occur for portions of the mixture, while other portions of the mixture are delivered to the ingress or inlet aperture 124 of the drum 102 in operation 220.

The drum 102 of the present disclosure differs from prior waste processing vessels due to such prior devices including trommel screens resulting a porous, water permeable device that functions to permit MSW having a specified particle size to fall through the screens, while retaining MSW having a size larger than the screen openings. Trommel screens cannot function to process the mixture of the MSW and water as provided herein because the screens prevent water from being retained in the vessel. The drum provided herein may be used in combination with trommel screens, e.g., the drum 102 may be provided upstream or downstream of a trommel screen. Accordingly, the drum 102 of the present disclosure may be free of screens. In addition, the drum 102 of the present disclosure may differ from prior waste processing techniques described herein because the fluid sprayed may not be in the form of steam and the waste processing may not be conducted under vacuum conditions. However, in some implementations, the water in the mixture may be heated to elevated temperatures to facilitate formation of the slurry, such as to temperatures of about 100 to about 200° F.

The drum may be rotated by a drive system adapted to tilt with the drum. The drum may be supported by a plurality of self-aligning trunnions such as a radial trunnion 500 and/or a thrust trunnion 600. Radial trunnions 130 enable the drum to rotate about an axis of rotation (i.e. longitudinal axis). The drum 102 may also be supported by a thrust trunnion 600 that at least partially restrains the longitudinal movement of the drum along its rotational axis. The thrust trunnion supports the thrust force generated by the horizontal component of the weight of the drum and the MSW load caused by the tilt of the drum.

With further reference to FIGS. 1A-1D, an example of a rotatable drum system 100 is shown. The rotatable drum system 100 includes a drum 102. The drum 102 is generally cylindrical in shape and formed of a thin wall or shell that extends circumferentially around a longitudinal axis. The drum 102 is tiltable. For example, one end portion of the drum 102 may be raised or lowered with respect to an opposite end portion, e.g., compare FIGS. 1C and 1D. The drum 102 is also adapted to rotate about its longitudinal axis by a drive system 300. Thus, the drum 102 may be tilted and/or rotated to process materials therein.

The wall of the drum 102 forms an internal processing chamber into which materials such as raw, or unprocessed MSW is received. The drum 102 is generally formed of a metallic material such as a steel alloy, although other materials such as plastics or composite materials may be used. The drum 102 forms an inlet aperture 124 at one end portion thereof, and an outlet aperture 118 at an opposite end portion thereof. The inlet aperture 124 is generally where materials are fed into the rotatable drum system 100. The outlet aperture 118 is generally where processed MSW leaves or is expelled from the rotatable drum system 100. The outlet aperture 118 may be formed in a cap 116 coupled to the shell. The outlet aperture 118 may be smaller in size than the inlet aperture 124. In some embodiments, the outlet aperture 118 is eccentric with respect to the longitudinal (i.e., rotational) axis of the drum 102. Such eccentricity provides the benefit of enabling control of the rate and/or particle size of the processed MSW leaving the drum 102. The drum 102 may include one or more blades 110 coupled to, or formed with, the inside wall of the drum 102. The blades 110 may assist in the attrition of the MSW, helping promote the lifting and breakage of the MSW into suitably sized particles.

The drum 102 is supported by a plurality of tires 106 each coupled to the drum 102 by respective bearing arrays 120. The tires 106 are generally in the form of respective rings with a circumferential face 134, a rear face 136 and a front face 132. The terms front and rear are for clarity of discussion only, are in no way limiting, and may be interchanged one with another. The bearing arrays 120 extend around a circumference of the drum 102 and provide for both support and constraint of the drum 102 within the respective tires 106. In the example shown, one tire 106 is proximate to the inlet aperture 124 of the drum 102 and one tire 106 is proximate to the outlet aperture 118. In many embodiments, the tires 106 include a wear-resistant material such as American Iron and Steel Institute ("AISI") 1045 grade steel. Other materials may be used such as other medium carbon steels e.g., AISI 1040 to 1053; AISI 4100 series steels, SA106 steel, ASTMA-27 Grade 70-40 steels, etc. In other embodiments, more or fewer tires 106 may be used. In some embodiments, the tire 106 is integrally formed with the drum 102 rather than being supported by a bearing array 120. The drum 102 is adapted to be rotated about its longitudinal axis with the tires 106 riding on portions of the radial trunnions 130 and/or thrust trunnion 600.

As described in further detail herein, the tires 106 are rotationally supported by one or more radial trunnions 130. At least one tire 106 (e.g., the rear tire) is longitudinally supported by the thrust trunnion 600. The radial trunnions 130 and thrust trunnion 600 include rollers that are rotationally coupled to an upper frame 114 of the carrier frame 111. The upper frame 114, via the trunnions, supports the weight of the drum 102, the tires 106, and load of MSW, etc. The upper frame 114 is pivotally coupled to a lower frame 112 at one or more pivots 122. The lower frame 112 of the carrier frame 111 supports the rotatable drum system 100 on a support surface such as a floor, the ground, etc.

The rotatable drum system 100 includes a lift mechanism 128 disposed between the upper frame 114 and the lower frame 112. The lift mechanism 128 is suitable to move one end portion of the drum 102 relative to the lower frame 112 and/or the opposite end portion of the drum 102 by pivoting the upper frame 114 about the one or more pivots 122 with respect to the lower frame 112. The lift mechanism 128 may include a hydraulic or pneumatic cylinder and piston assembly, a ball screw, power screw, rack and pinion, ratchet and pawl, or any other suitable mechanism that can selectively move one end portion of the drum 102 with respect to the lower frame 112 and/or opposite end portion. In many embodiments, the lift mechanism 128 is configured to lift the inlet of the drum 102 relative to the outlet of the drum 102 (i.e., a positive tilt angle). A positive tilt angle is generally greater than 0° and less than or equal to 5°. However, in some embodiments, the tilt angle may be up to 10°, 15° or even 30°. In some embodiments, the lift mechanism 128 may be adapted to lower the inlet of the drum 102 relative to the outlet. For example, in some embodiments, the inlet may be tilted below the outlet an angle less than 0° up to about −10°.

By controlling the tilt of the drum 102, the processing of MSW in the rotatable drum system 100 may be controlled. For example, with materials that are relatively easy to break down (e.g., paper), the drum 102 may be tilted to a higher positive tilt angle such that the materials (e.g., MSW) has a lower residence time in the drum 102 and is not over-processed into particles that are smaller than desired. Conversely, with materials that are more difficult to break down (e.g., cardboard), the tilt angle of the drum 102 may be less than is used with easily broken materials. The tilt angle may also be used to control the throughput of the materials through the rotatable drum system 100. For example at a higher tilt angle, the throughput may be higher than at a lower tilt angle.

Similarly, by controlling the rotational speed of the drum 102, the size and/or throughput of materials through the rotatable drum system 100 may be controlled or adapted to different materials. For example, materials that are relatively easy to break down (e.g., paper) may be processed at a lower speed than relatively more durable materials (e.g., cardboard). The tilt angle and/or rotational speed may be automatically controllable by a computer or other processing element. The tilt angle and rotational speed of the drum 102 may be used in combination to control the throughput and/or characteristics of the processed material (e.g., particle size and/or saturation).

With specific reference to FIGS. 3A-3E, an example of a drive system 300 suitable for use with the rotatable drum system 100 is disclosed. As discussed above, the drum 102 of the rotatable drum system 100 is tiltable about the one or more pivots 122, e.g., compare FIGS. 3B and 3C. Such tilting causes difficulties in rotating the drum 102 at various tilt angles. The drive system 300 solves such problems by being tiltable with the drum 102 such that the drum 102 may be rotated at substantially any tilt angle. Furthermore, the drum 102 may continue to be driven by the drive system 300 simultaneously with adjustments in the tilt of the drum 102 from the lift mechanism 128.

The drive system 300 includes a rotary actuator 306 (such as a motor (hydraulic, electric, or pneumatic) or engine), a driving member 312, a driven member 304, and optionally a flexible element 302. The flexible element 302, the driven member 304, and/or the driving member 312 may be at least partially enclosed in one or more guards 108. In many embodiments, the rotary actuator 306 is a variable speed actuator such as a variable frequency drive that can cause the drum 102 to turn at a desired speed. In many embodiments, the drive system 300 can rotate the drum 102 in either a clockwise or counter-clockwise direction. For example, the rotation direction of the rotary actuator 306 may be reversible. In many embodiments, the rotary actuator 306 includes a motor and a transmission or gearbox that adapts the speed and/or torque of the motor to an output shaft.

In some embodiments, the driven member 304 and driving member 312 are sprockets, gears, pulleys, or similar disc or ring-like structures, or the like. The driven member 304 is fixed to the drum 102. In many embodiments, the driven member 304 is fixed to the outer surface of the drum 102 such as by an array of flanges 322. The flanges may be welded to the drum 102 and may be fixed to the driven member 304 by suitable fasteners such as bolts. In many embodiments, the driven member 304 shares a common rotational axis with the drum 102 such that the drum 102 and the driven member 304 rotate substantially together.

The driving member 312 is coupled to the rotary actuator 306. For example, a rotary coupler 310 may be used to rotationally link the rotary actuator 306 and the driving member 312. The rotary coupler 310 transmits torque and speed between the rotary actuator 306 and the driving member 312. The rotary coupler 310 may allow for slight misalignment of the rotary actuator 306 and driving member 312, such as angular or displacement misalignments. Additionally or alternately, the rotary coupler 310 may provide some level of shock absorption between the rotary actuator 306 and the driving member 312. Additionally or alternately, the driving member 312 may provide a stress relief feature such as a shear pin suitable to reduce damage to the drive system 300 should a component become stuck or jammed.

Figure 3A:
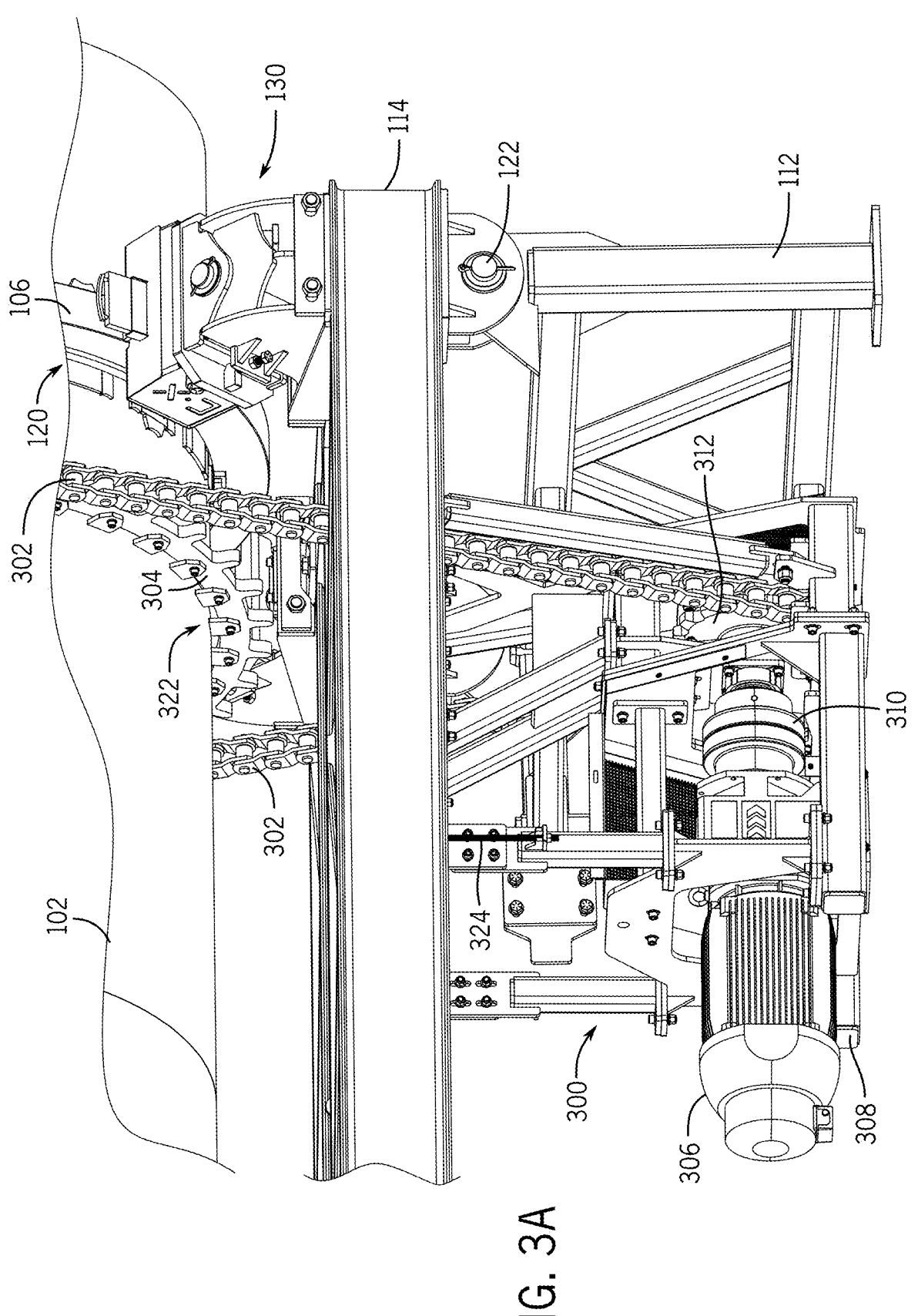
FIG. 3A is a side perspective view of a drive assembly suitable for use with the rotatable drum system of FIGS. 1A-1I.
Figure 3B:
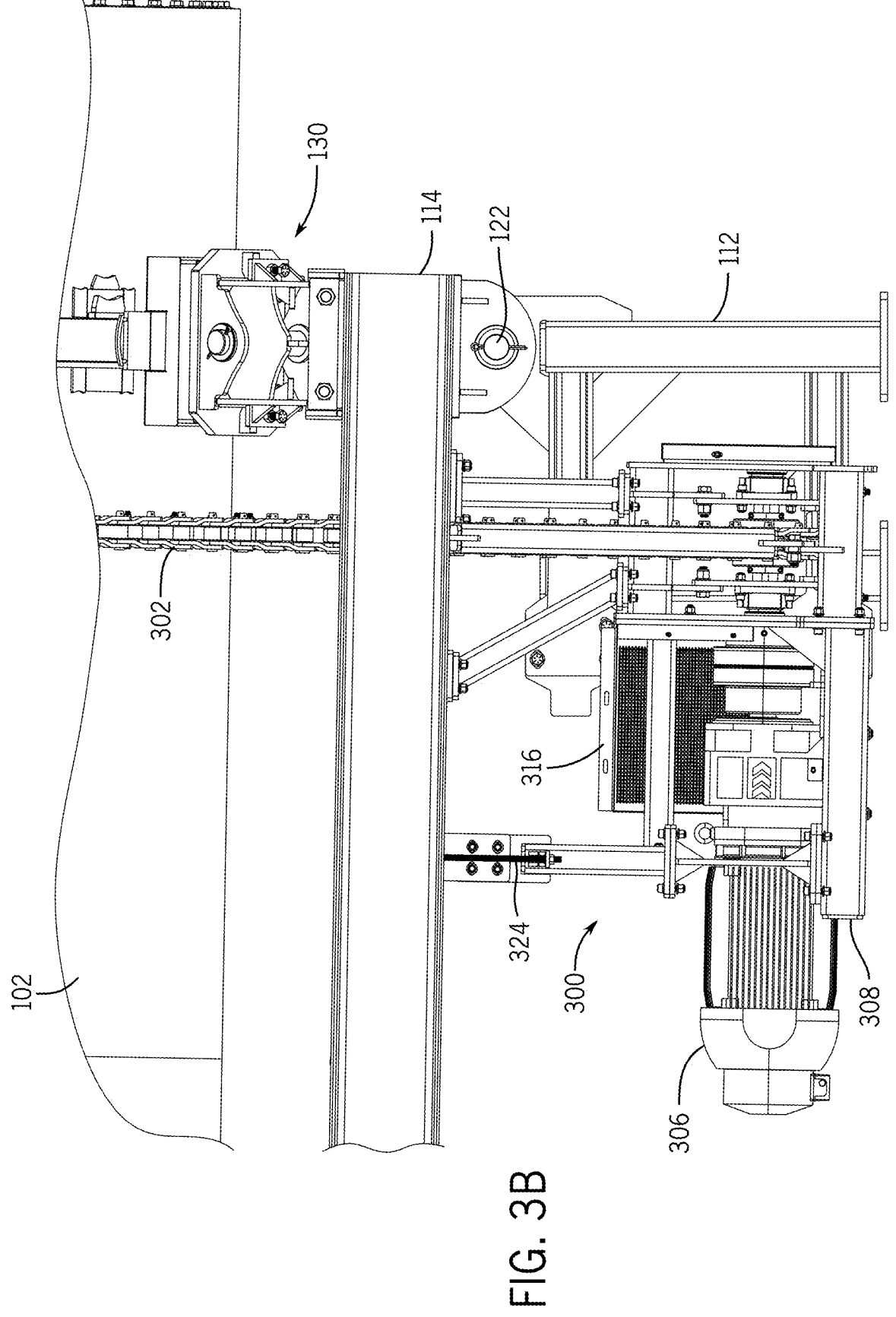
FIG. 3B is a side elevation view of the drive assembly of FIG. 3A in a first configuration.
Figure 3C:
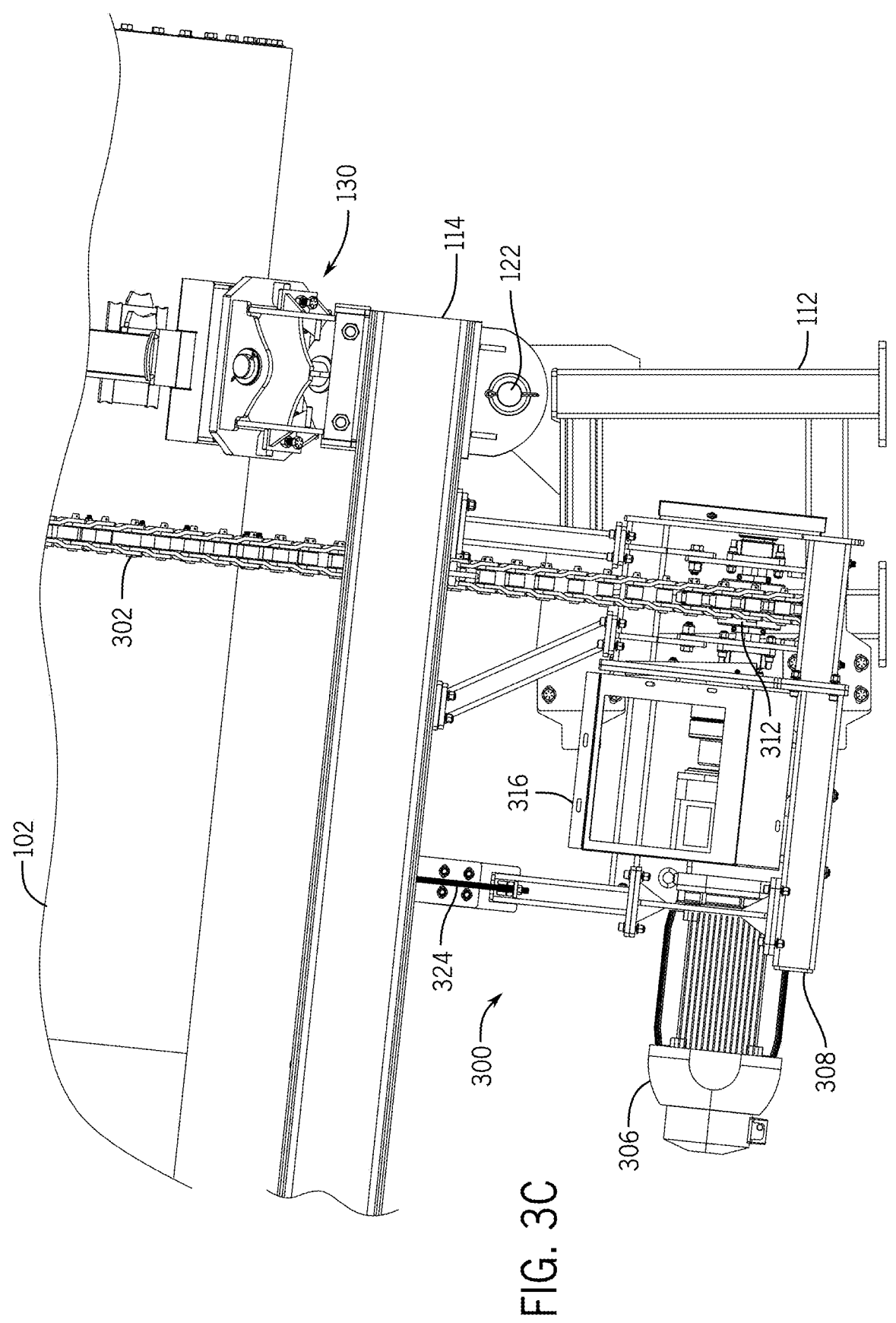
FIG. 3C is a side elevation view of the drive assembly of FIG. 3A in a second configuration.

In some embodiments, the flexible element 302 (if used) is a chain (e.g., a roller chain), a gearbelt, v-belt, or the like. The flexible element 302 may be disposed about at least a portion of the circumference of either or both the driving member 312 or the driven member 304. The flexible element 302 may engage one or more features of the driving member 312 and/or driven member 304 to enable the transmission of torque and speed therebetween. For example, as shown in FIG. 3A, the driven member 304 and the driving member 312 are toothed sprockets. The teeth of the sprockets engage links in the flexible element 302, which in the example shown, is a roller chain. Typically each tooth engages one chain link at a time. In other examples, the driven member 304 and the driving member 312 may be V-belt pulleys and the flexible element 302 may be a V-belt. In this example, the engagement of the driven member 304 and the driving member 312 is via a frictional engagement of the belt in the V of the pulleys. In other examples, the driven member 304 and the driving member 312 may be geared pulleys and the flexible element 302 may be a gear belt or chain.

The rotary actuator 306 turns the driving member 312 which in turn causes the flexible element 302 (if used) to turn the driven member 304, thus rotating the drum 102 about its longitudinal axis. In many embodiments, the driven member is larger in diameter than the driving member 312 and thus there exists a speed (e.g., gear) ratio between the driven member 304 and the driving member 312. In some embodiments, the drive system 300 is adapted to rotate the drum 102 at a rotational speed greater than zero revolutions per minute ("RPM") up to about 30 RPM. In many embodiments, the drive system 300 is adapted to rotate the drum 102 at about 10-15 revolutions per minute.

In some embodiments, the flexible element 302 is not used. For example, the driving member 312 may be a pinion gear and the driven member 304 may be a ring gear. The driven member 304 and the driving member 312 may be disposed proximate to one another such that respective teeth (e.g., involute teeth, hypocycloid teeth, herringbone teeth, etc.) of the driven member 304 and the driving member 312 mesh with one another and the driving member 312 can drive the driven member 304.

Portions of the drive system 300 are coupled (e.g., fixedly or adjustably coupled) to a carriage 308 that is itself fixedly coupled to the upper frame 114. The carriage 308 supports the rotary actuator 306 and the driving member 312. In some embodiments, the carriage 308 may also support a cooler 316 or other components of the drive system 300. The carriage 308 shown for example in the figures is disposed below the upper frame 114 and nests within the lower frame 112. In other embodiments, the carriage 308 may be disposed in any location around the circumference of the drum 102. For example, the carriage 308 may be disposed on a side of the drum 102, above the drum 102, or in any location therebetween.

The tension and/or alignment of the flexible element 302 may be controlled by adjusting the location of the carriage 308 with respect to the upper frame 114. For example, the carriage 308 may be adjustably coupled to the upper frame 114 by one or more adjusters 324 adapted to raise, lower, rotate, translate, or otherwise move the carriage 308 relative to the upper frame 114. The adjusters 324 may include a threaded element (e.g., threaded rod, bolt, screw, etc.) that threadedly engages with a portion of the upper frame 114 to enable the respective adjustments. Typically, the adjusters 324 may be used to align the rotary actuator 306 and/or driving member 312 with the flexible element 302 and/or the driven member 304. The adjusters 324 are not typically used to tilt the upper frame, drive system, or the drum with respect to the lower frame or support surface.

The drive system 300 provides many benefits. For example, as materials are processed in the rotatable drum system 100, the tilt of the drum 102 may be changed, even dynamically changed such as via computer control, and the drive system 300 can continue to rotate the drum 102 irrespective of the tilt of the drum 102 or the upper frame 114 relative to the lower frame 112. In essence, the operation of the lift mechanism 128, trunnion assemblies, and the drive system 300 may be decoupled such that one does not affect the operation of the others. Furthermore, the location of the carriage 308 and the upper frame 114 relative to one another can be easily changed to align and/or tension the flexible element 302 without the need for expensive and complicated idlers or tensioners. Thus, the rotatable drum system 100 is simpler to set up, operate, and maintain with respect to a rotatable drum system 100 without the features disclosed herein.

Figure 4:
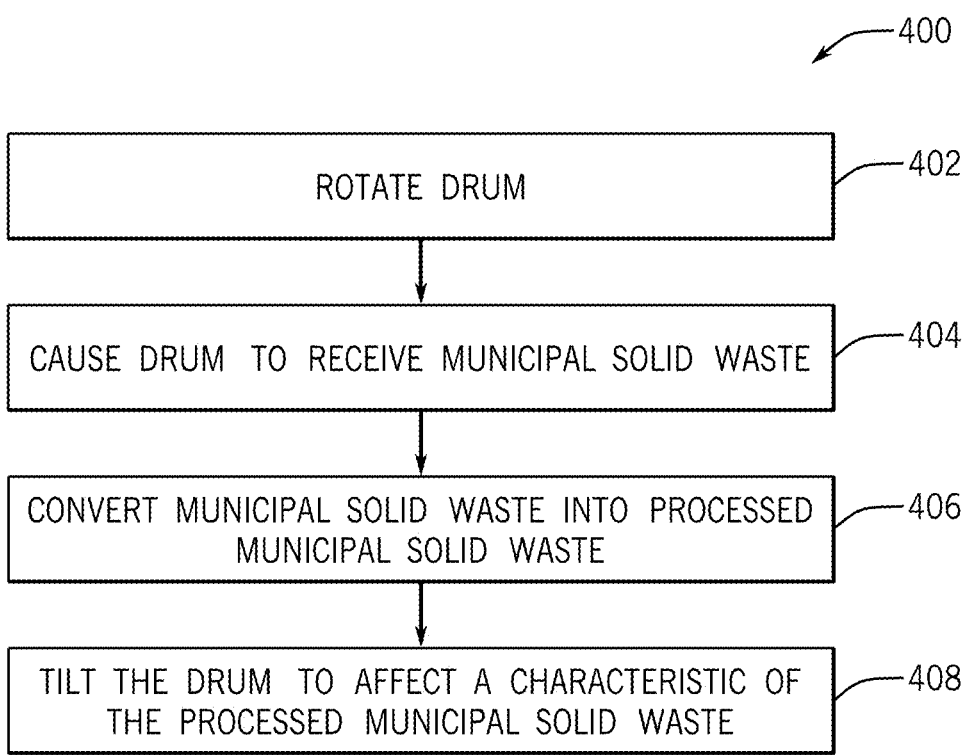
FIG. 4 is a flowchart of a method of processing municipal solid waste with the system of FIGS. 1A-1I.

FIG. 4 shows an example of a method 400 of processing MSW with the system of FIG. 1. The method 400 may begin in operation 402 and a drum 102 is rotated. For example, the drive system 300 may cause the drum 102 to rotate. For example, the rotary actuator 306 may cause the driving member 312 to generate motion of the flexible element 302. The motion of the flexible element 302 may cause the driven member 304 and thus the drum 102 to rotate. The drum 102 may be rotationally supported on the upper frame 114 such as by one or more self-aligning trunnions. The method 400 may proceed to operation 404 and the drum 102 receives MSW. For example, a conveyor or other means may place MSW through the inlet aperture 124. In some embodiments, the MSW may be received in the inlet aperture 124 via a waste treatment apparatus for example as disclosed in U.S. patent application Ser. No. 17/401,497 which is incorporated herein by reference in the entirety. The method 400 may proceed to operation 406 and the drive system 300 rotates to convert the MSW into processed MSW, as discussed herein. The method 400 may proceed to operation 408 and the drum 102 is tilted to affect a characteristic of the processed MSW. For example, the upper frame 114 may be pivotally connected to the lower frame 112, and a lift mechanism 128 may be operative to pivot the upper frame and drum with respect to the lower frame, and/or the support surface upon which the lower frame is disposed. The characteristic of the processed MSW may include a throughput of the processed MSW or a particle size of the processed MSW. The drum it tiltable while being driven, and vice versa. For example, as the drum is rotated by the drive system, the drum may simultaneously be tilted to affect the characteristics of the processed MSW.

The present disclosure additionally provides for systems and methods of providing radial trunnions and thrust trunnions that may be used in operating a rotatable drum system, and related components and subsystems.

Figure 5A:
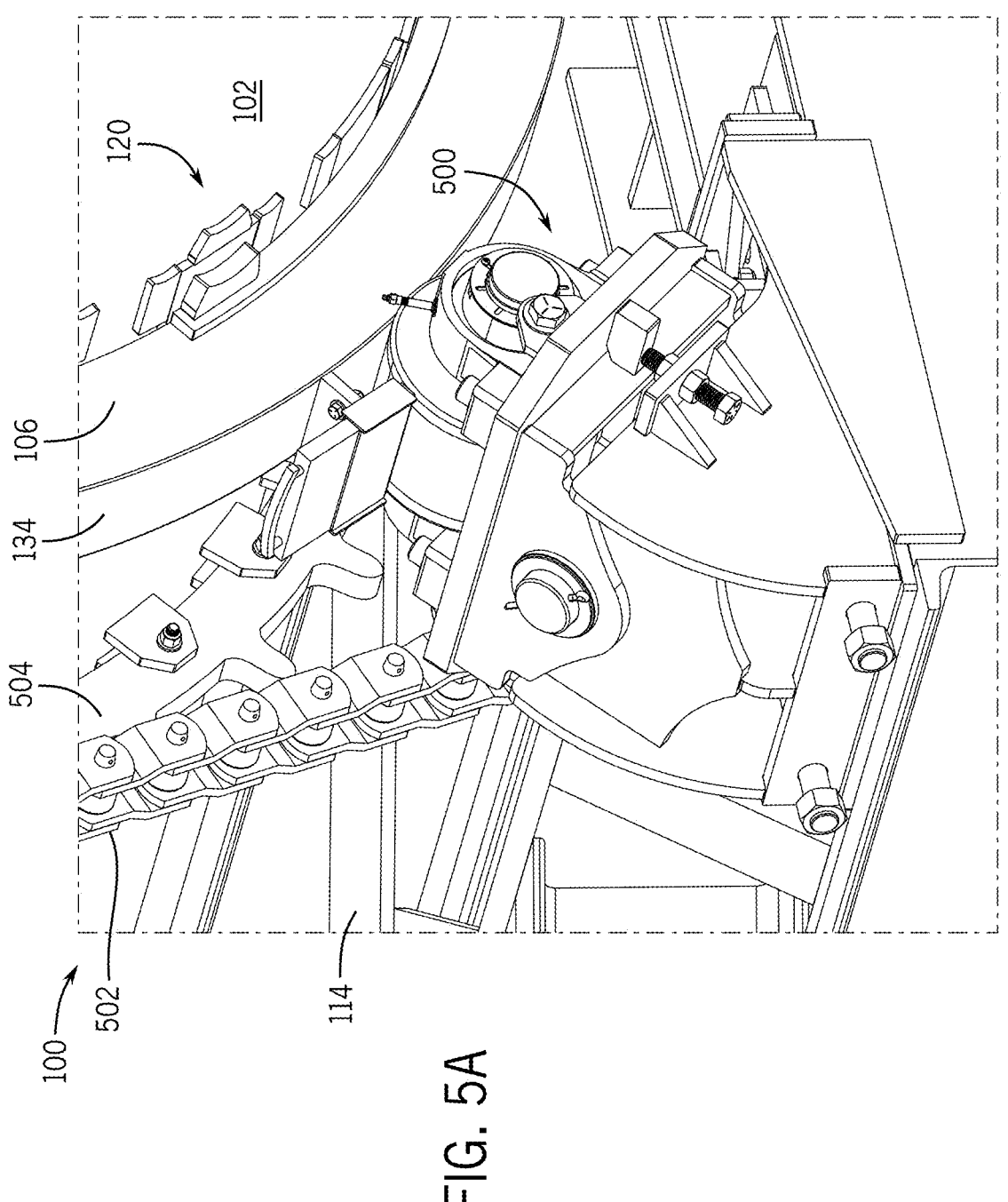
FIG. 5A is a perspective view of a radial trunnion suitable for use with the rotatable drum system of FIGS. 1A-1I.

With reference to FIG. 5A, the drive system 300 includes a rotary actuator (such as a motor or engine), a drive member, a driven member 504, and a flexible element 502. In some embodiments, the driven member 504 and driving member are sprockets, gears, pulleys, or the like. In some embodiments, the flexible element 502 is a chain (e.g., a roller chain), a gearbelt, v-belt, or the like. The flexible element 502, the driven member 504, and/or the driving member may be at least partially enclosed in one or more guards 108. The rotary actuator turns the driving member which in turn causes the flexible element 502 to turn the driven member 504, thus rotating the drum 102 about its longitudinal axis. In many embodiments, the driven member is larger in diameter than the driving member and thus there exists a speed (e.g., gear) ratio between the driven member 504 and the driving member. In some embodiments, the drive system 300 is adapted to rotate the drum 102 at a rotational speed greater than zero revolutions per minute ("RPM") up to about 30 RPM. In many embodiments, the drive system 300 is adapted to rotate the drum 102 at about 10-15 revolutions per minute. In many embodiments, the rotary actuator is a variable speed actuator such as a variable frequency drive that can turn the drum 102 at a desired speed.

By controlling the tilt of the drum 102, the processing of MSW in the rotatable drum system 100 may be controlled, and the tilt angle may also be used to control the throughput of the materials through the rotatable drum system 100. For example at a higher tilt angle, the throughput may be higher than at a lower tilt angle.

Similarly, by controlling the rotational speed of the drum 102, the size and/or throughput of materials through the rotatable drum system 100 may be controlled or adapted to different materials as provided herein. The tilt angle and rotational speed of the drum 102 may be used in combination to control the throughput and/or characteristics of the processed material (e.g., particle size and/or saturation).

Figure 5B:
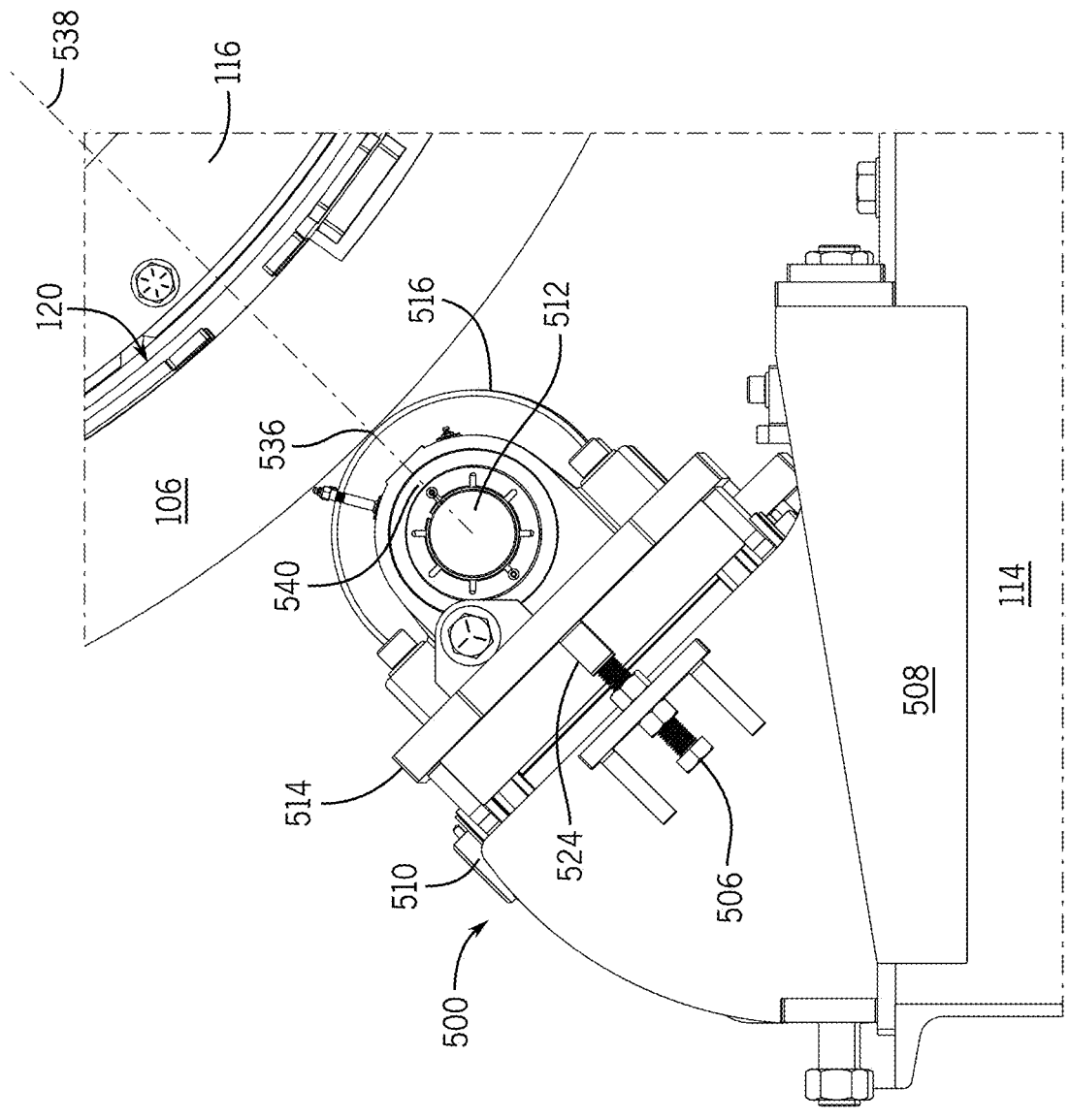
FIG. 5B is a front elevation view of the radial trunnion of FIG. 5A.
Figure 5C:
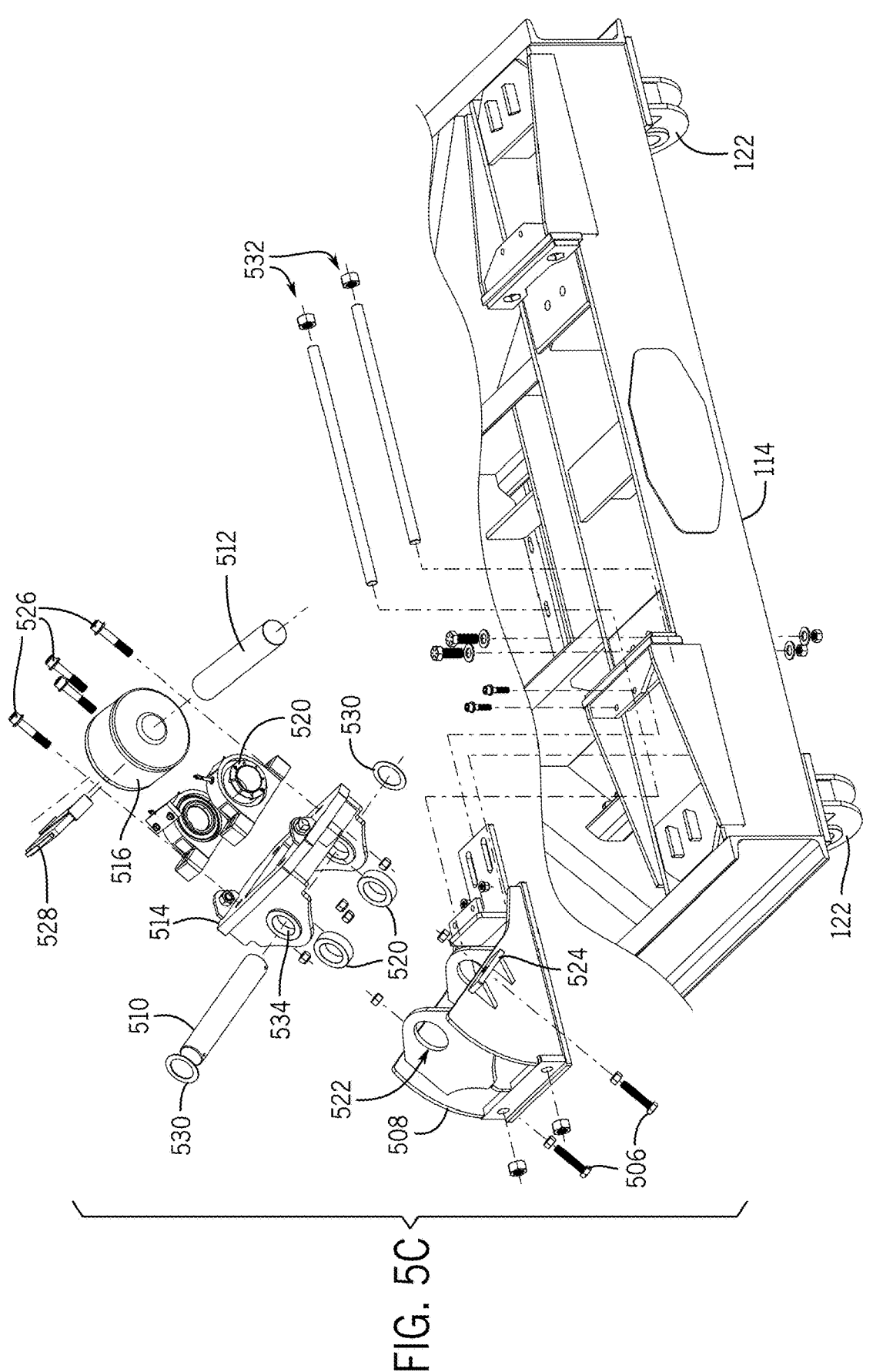
FIG. 5C is an exploded view of the radial trunnion of FIG. 5A.

With reference to FIGS. 5A-5C, an example of a radial trunnion 500 is disclosed. The radial trunnion 500 is adapted to interface with the tire 106 to rotationally support the drum 102. The radial trunnion 500 includes a roller 516 that makes rotational contact with a circumferential face 134 of the tire 106. The roller 516 is generally in the form of a cylindrical wheel. The tire is generally larger in diameter than the roller, such that the roller turns as a higher rate than the tire. Thus, the roller is typically subjected to faster wear than the tire. Therefore in man examples, the roller 516 is typically made from a harder, more wear resistant material than the tire 106. In many examples, the roller 516 is formed of a wear resistant material such as AISI 4140 steel, AISI 5000 series, AISI 6000 series, or AISI 8000 series steels. The roller 516 may be subjected to processes such as flame hardening, quenching, case hardening, carburization etc. to further increase its wear capabilities. The radial trunnion 500 is adapted to self-align with respect to the tire 106.

The radial trunnion 500 includes a base 508. In many embodiments, the base 508 is couplable to the upper frame 114 of the rotatable drum system 100 such as with one or more retainers 532. The retainers 532 and other fasteners disclosed herein may be bolts, screws, pins, rivets, or any other device suitable to secure the base 508 to the upper frame 114. In some embodiments, the base 508 is integrally formed with the upper frame 114 or is fixedly coupled to the upper frame 114 such as by welding, brazing, or the like. The base 508 includes an aperture 522 formed therein and configured to receive a first axle 510. The first axle 510 pivotally couples the base 508 to a rocker 514 via an aperture 534 formed in the rocker 514. Either or both of the apertures 522 and/or apertures 534 may be formed of two or more apertures substantially aligned with one another. For example, as shown in FIG. 5C, the aperture 522 includes two apertures formed in offset plates of the base 508. The first axle 510 is rotationally coupled to the rocker 518 by one or more bearings 520. Bushings may be used in place of bearings in some embodiments. One or more retainers 530 such as washers or circlips may secure the first axle 510 to the rocker 514.

The rocker 514 supports the roller 516. The roller 516 is rotationally coupled to the rocker by a second axle 512. The second axle 512 may be supported and rotationally coupled to the rocker 514 by one or more bearings 520 or bushings. The bearings 520 may be secured to the rocker 514 via one or more fasteners 526.

A lubricator 528 may optionally be supplied to lubricate the rolling interface between the roller 516 and the tire 106. In some embodiments, the lubricator 528 applies a grease, oil, or solid based lubricant (e.g., graphite) to the face of the roller 516.

The first axle 510 may be tilted at an angle relative to the support surface upon which the rotatable drum system 100 is disposed. Generally, the first axle 510 may be at any angle from (and including) 0° up to about 90° from the support surface such that at least some of the vertical load of the drum 102 or the MSW therein is supported by the radial trunnion 500. In many implementations, the first axle 510 is disposed at an angle tangent to the circumferential face 134 of the tire. Thus, the point of contact 536 between the tire 106 and the roller 516 may be such that the radius 538 of the tire 106 and radius 540 of the roller 516 are aligned with one another at the point of contact 536. Such an arrangement may have the benefit of providing an efficient transfer of load from the drum 102 through the radial trunnion 500 and may reduce bearing 520, roller 516 and/or tire 106 wear. For example, as shown in FIG. 5B, the first axle 510 is disposed at an angle of about 45° relative to horizontal and the radius 540 of the roller 516 radius is substantially aligned with a radius 538 of the tire 106 at the point of contact 536.

The angle of the base 508 with respect to the rocker 514 may be limited or restrained by one or more angular adjusters 506. The angular adjusters 506 may be threadedly received in the base 508 and may contact the rocker 514 such as at a boss 524 to bias the rocker 514 at an angle relative to the base 508. Additionally, or alternately, the angular adjusters 506 may restrain, lock, or otherwise limit the angular displacement of the rocker 514 relative to the base 508.

The second axle 512 is generally aligned with the longitudinal axis of the drum 102. In many embodiments, the second axle 512 is disposed at an angle relative to the first axle 510. For example, as shown, the first axle 510 and the second axle 512 are substantially orthogonal to one another.

As the drive system 300 rotates the drum 102, the rocker 514 may pivot relative to the base 508 about the first axle 510 to accommodate imperfections or variations in the circumferential face 134 of the tire. Thus, the roller 516 may move to follow the contours of the circumferential face 134 and maintain the point of contact 536 between the tire 106 and the roller 516 despite imperfections in the tire 106. For example, the tire 106 may not be round, smooth, or the circumferential face 134 may be warped or twisted. Such imperfections are common due to limitations of manufacturing processes and/or component wear with use in industrial and/or material processing applications. Additionally or alternately, the tire 106 may be elastically deformed such as due to loading from the drum contents or forces imparted by the drive system 300 or tilt of the drum 102. A benefit of the radial trunnion 500 may be the ability to support the drum 102 in a variety of conditions, wear states, tilt angles, etc. without the need for expensive and time-consuming re-alignment or other service procedures. Additionally, the self-aligning features of the radial trunnion 500 may enable the use of a tire 106 with relatively less precise manufacturing tolerances than would be possible without the self-aligning radial trunnions 500. Such a tire 106 could be less expensive than a tire 106 with tighter manufacturing tolerances.

Figure 6A:
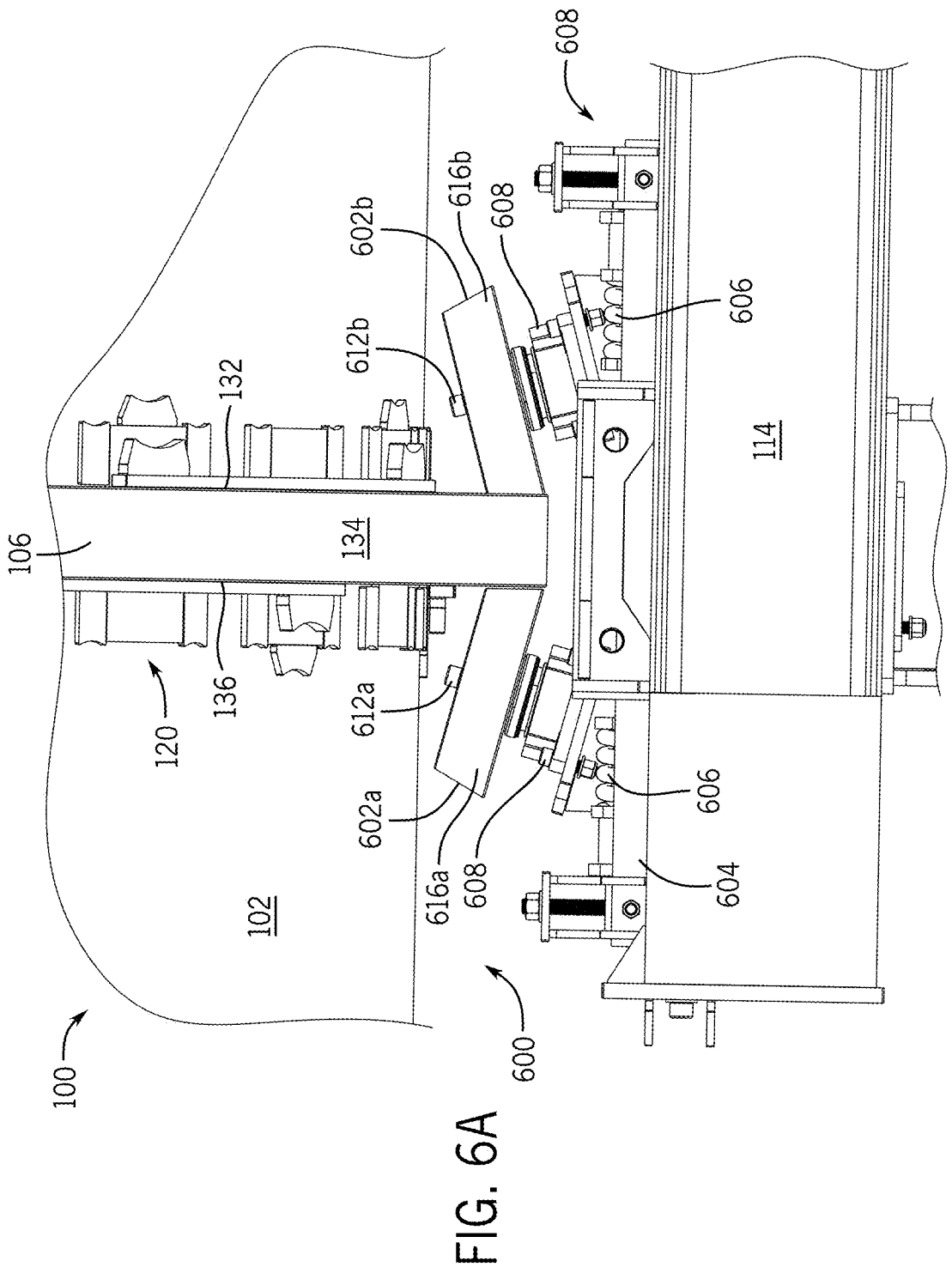
FIG. 6A is a side elevation view of a thrust trunnion suitable for use with the rotatable drum system of FIGS. 1A-1I.
Figure 6B:
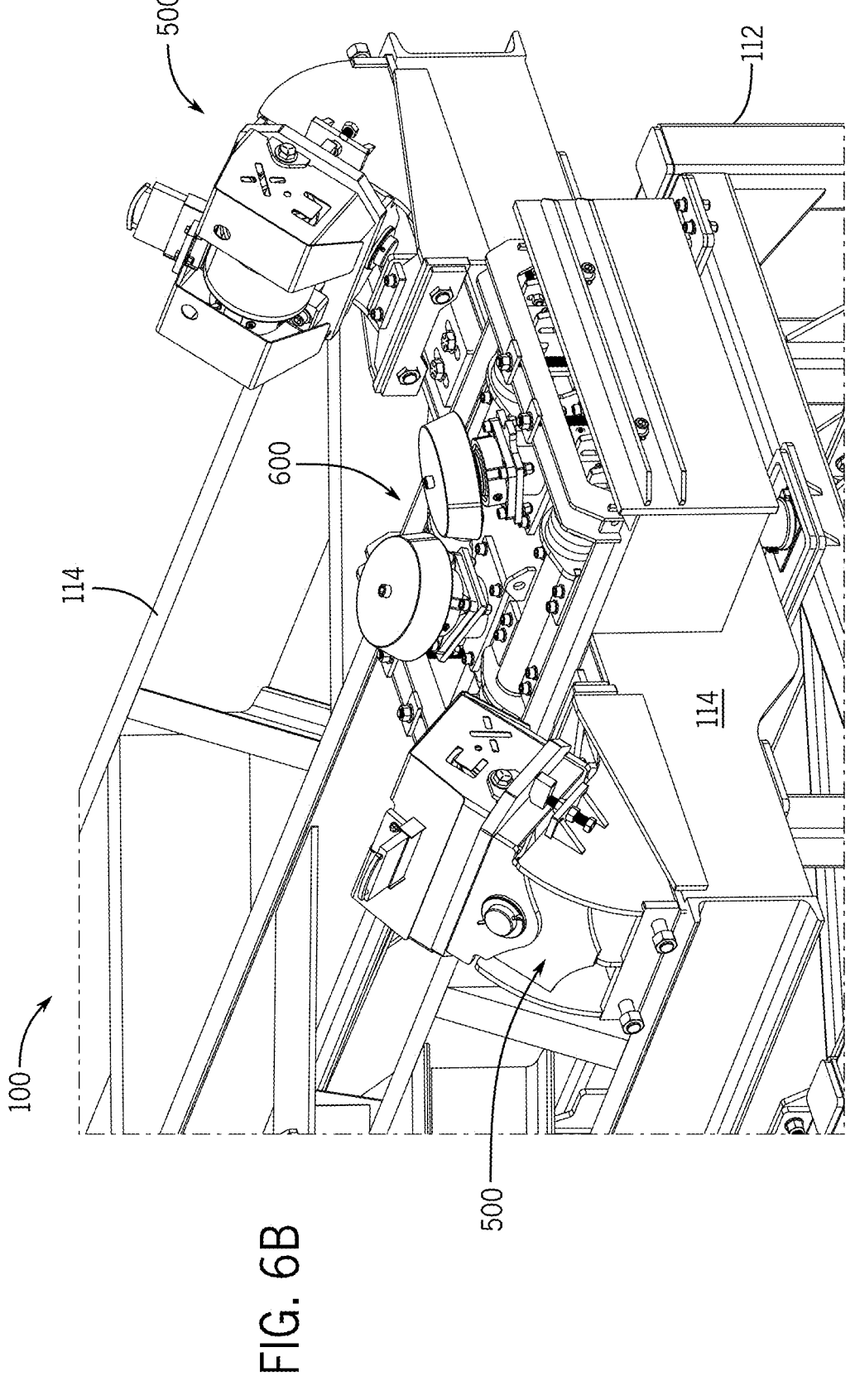
FIG. 6B is a perspective view of the thrust trunnion of FIG. 6A.
Figure 6C:
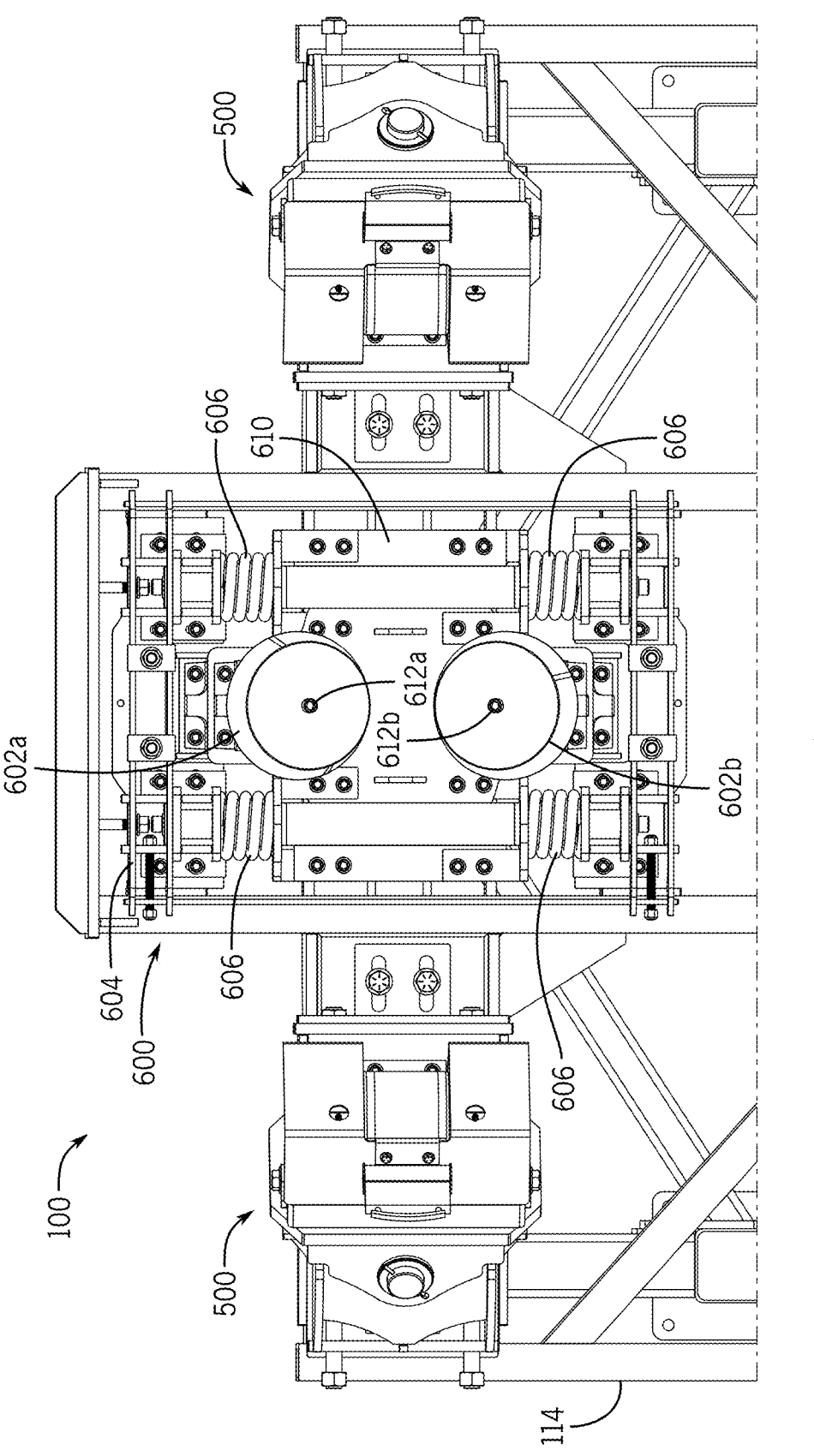
FIG. 6C is a plan view of the thrust trunnion of FIG. 6A.
Figure 6D:
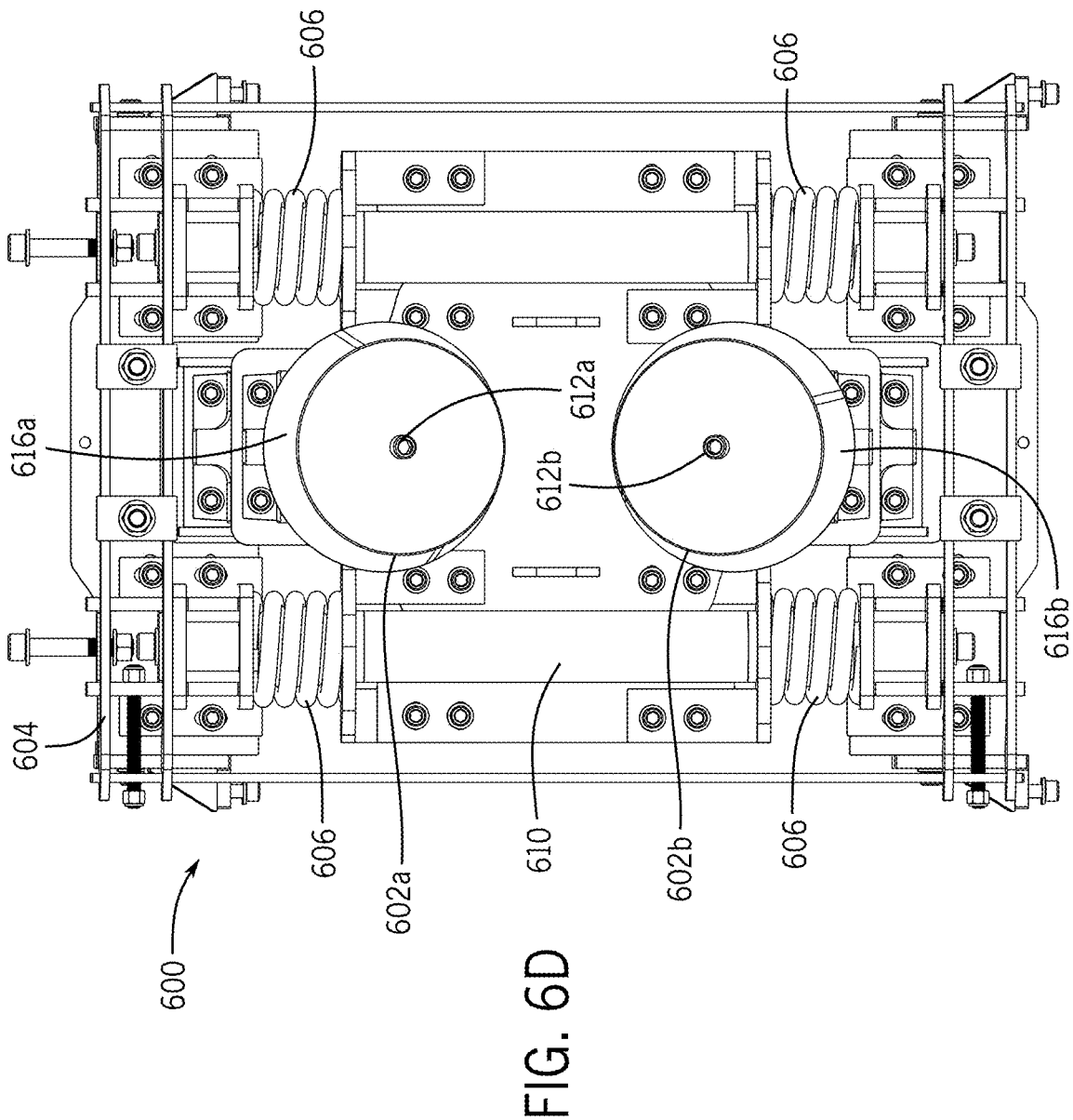
FIG. 6D is a simplified plan view of the thrust trunnion of FIG. 6A.
Figure 6E:
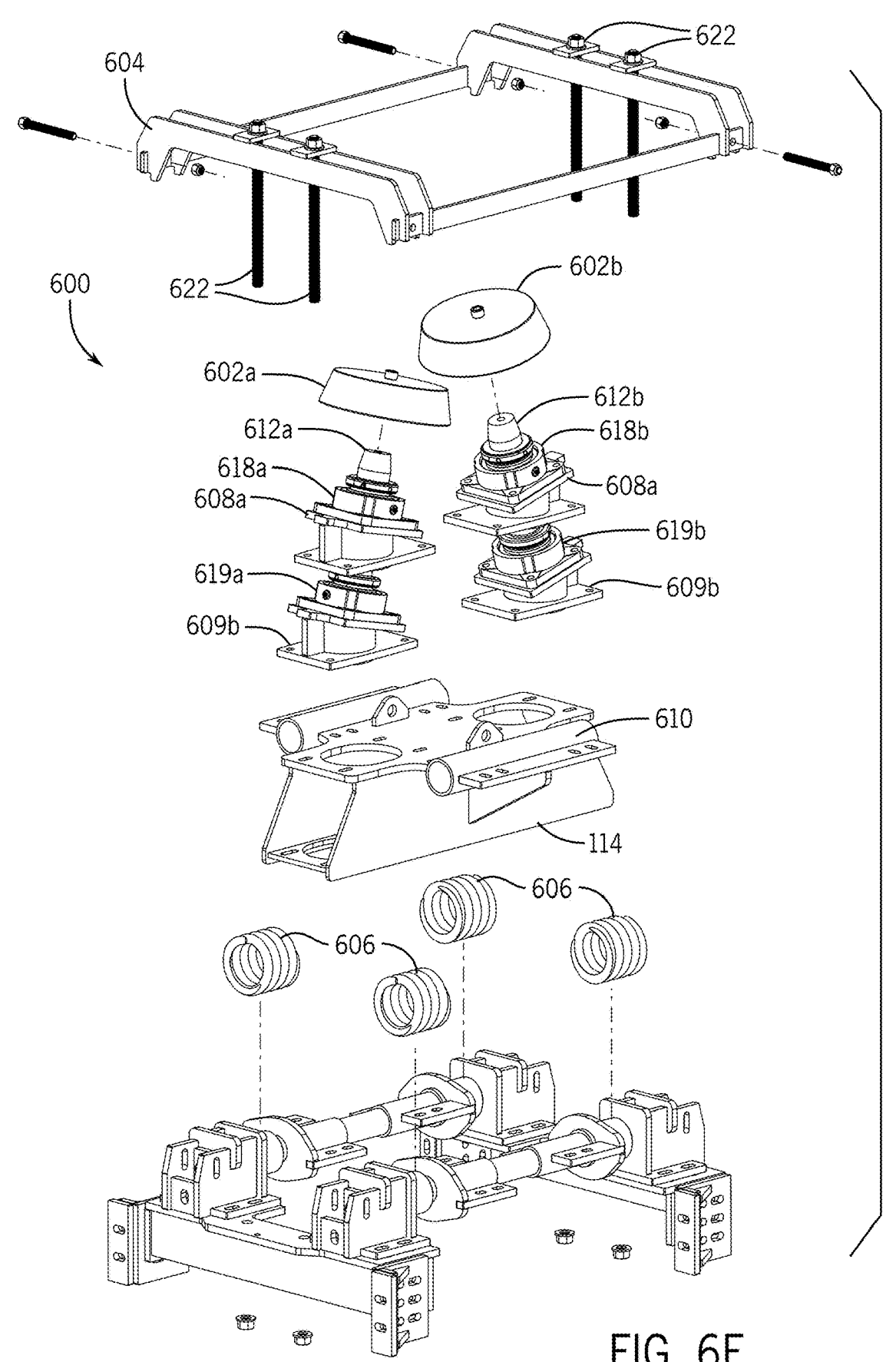
FIG. 6E is a partially exploded perspective view of the thrust trunnion of FIG. 6A.
Figure 6F:
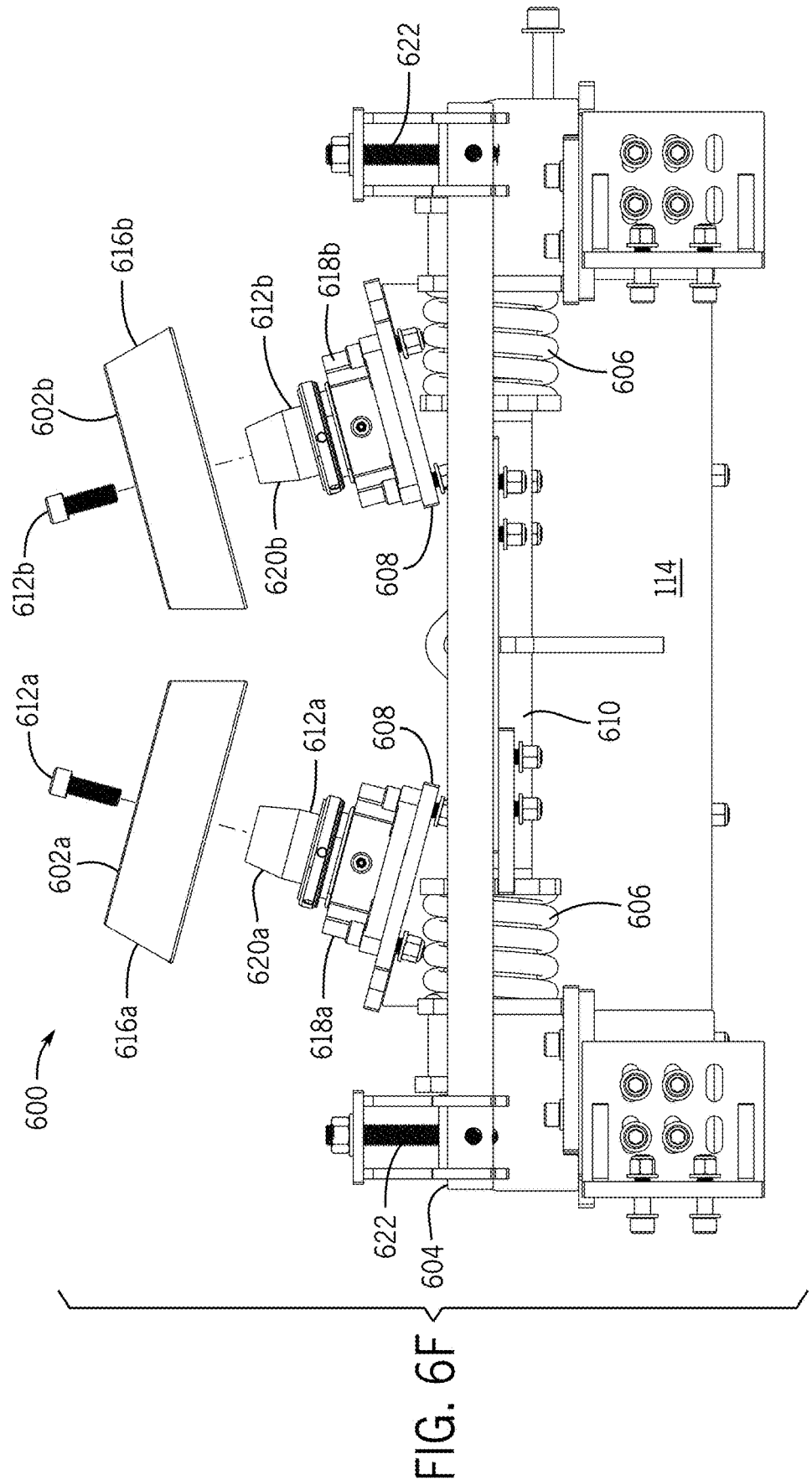
FIG. 6F is a partially exploded view of the thrust trunnion of FIG. 6A.

With respect to FIGS. 6A-6F, an example of a thrust trunnion 600 is disclosed. FIG. 6A is a side elevation view of a thrust trunnion suitable for use with the rotatable drum system of FIGS. 1A-1I, while FIG. 6B is a perspective view of the thrust trunnion of FIG. 6A, FIG. 6C is a plan view of the thrust trunnion of FIG. 6A, FIG. 6D is a simplified plan view of the thrust trunnion of FIG. 6A, FIG. 6E is a partially exploded perspective view of the thrust trunnion of FIG. 6A, and FIG. 6F is a partially exploded view of the thrust trunnion of FIG. 6A. The thrust trunnion 600 is adapted to longitudinally support the drum 102 via one or more faces of a tire 106. As with the radial trunnion 500, the thrust trunnion 600 is self-aligning with respect to the tire 106. The thrust trunnion 600 includes a hanger 604 coupled to the upper frame 114 such as by one or more height adjusters 622 (FIG. 6E). The thrust trunnion 600 includes a carriage 610 resiliently supported to the upper frame 114 and the hanger 604 by one or more resilient members 606.

The thrust trunnion 600 includes one or more rollers 602 that interface with either or both of the front face 132 or rear face 136 of a tire 106. The rollers 602a/b are rotationally coupled to the carriage 610 by one or more respective piers 608, 609 at respective axles 612a/b and by respective bearings 618a/b, 619a/b. For example, the axles 612 *a/b* may be supported at intervals by a bearing 618a/b and a bearing 619a/b. In particular, the bearing 618a/b may be coupled to an upper portion of the axle 612a/b and the bearing 619a/b may be coupled to a lower portion of the axles 612a/b. The bearings 618a/b, 619a/b may be coupled to one or more respective piers 608a/b and 609a/b. Thus, the bearings 618, 619 may rotationally couple the axles 612 to the piers 608, 609. The piers 608a/b and 609a/b may couple the bearings to the carriage 610. An advantage of this arrangement may be that the lower bearing 619a/b helps counteract any moment imparted to the shafts 612a/b by the tire 106, thus preventing or reducing premature wear or binding of the upper bearings 618 *a/b*. The rollers 602a/b may have receptacles formed therein and adapted to receive respective tapered end portions 620a/b (see, e.g., FIG. 6F) of the axles 612a/b. The tapered end portions 620a/b may center the rollers 602a/b with respect to the axles 612a/b and/or bearings 618a/b. While in the example shown, two rollers 602a/b are used, in some implementations only one roller 602 may be used. For example, the roller 602a may be disposed toward an inlet aperture of the drum and may be normally above the roller 602b when the drum 102 is tilted. The roller 602a may be used to prevent the drum from "walking" backward up the upper frame, such as if the radial trunnions are not properly aligned or the tire is deformed sufficiently that the radial trunnions cannot self-align. In some implementations, the roller 602a may be replaced with a bushing formed out of a low friction material such as a plastic (e.g., ultra-high molecular weight polyethylene). In many implementations, only one of the rollers 602a/b is configured to be in contact with the tire 102. In many implementations, one or both rollers 602 are transversely offset (e.g., left or right relative to the rotational axis of the drum 102). For example, if the drum normally rotates clockwise when viewed from the inlet aperture, the rollers 602a/b may be offset to the right of the rotational axis of the drum 102. An advantage of such an implementation may be that the tire 102 presses down on the rollers 602 and the bearings 618, 619 which may be better able to withstand compressive loads than tensile loads. For example, if the rollers 602 are aligned, or to the left of, the rotational axis of the drum 102 (again while rotating clockwise viewed from the inlet aperture 124), the tire 106 may tend to lift or pull on the rollers and/or bearings. In many implementations, the rollers 602*a/b* are formed of a similar material as the roller 516 (e.g., AISI 4140 steel).

In many implementations, the rollers 602*a/b* are truncated conical rollers. Thus, the rollers 602*a/b* may have conical faces 616*a/b*. The angle of the conical faces 616*a/b* of the rollers 602*a/b* may be based on, or substantially match, a tilt angle of the rollers 602*a/b* with respect to the carriage 610. For example, as shown in FIG. 6A, the axles 612*a/b* of the rollers 602*a/b* are tilted or skewed by the piers 608 about 20° from a normal face of the carriage 610. Similarly, the axle 612*a* may be tilted or skewed with respect to the longitudinal axis of the drum 102. The angle of the conical faces 616*a/b* of the rollers 602*a/b* are also about 20° such that the respective conical faces 616*a/b* of the rollers 602*a/b* contact the respective front face 132 and rear face 136 of the tire 106.

The carriage 610 can move with respect to the upper frame 114 with at least four degrees of freedom (e.g., translation in the x, y, or z directions and rotation) such that the conical faces 616*a/b* of the rollers 602*a/b* are in contact with the respective front face 132 and rear face 136 of the tire 106. In many examples, the resilient members 606 that support the carriage 610 are springs such as coil springs that bias the carriage 610 (and thus the rollers 602*a/b*) toward the tire 106. As best shown for example in FIG. 6A, the rollers 602*a/b* are biased toward the respective rear face 136 and front face 132 of the tire 106 such that the conical faces 616*a/b* maintain contact with the respective front face 132 and rear face 136 of the tire 106 as the tire 106 and drum 102 are rotated by the drive system 300.

As the carriage 610 is resiliently supported with respect to the upper frame 114 and the hanger 604, the carriage 610 can move with respect to the upper frame 114 and/or hanger 604 such as to account for imperfections in the tire 106. Similar to the radial trunnion 500 discussed previously, the thrust trunnion 600 enables the use of a less expensive tire 106 with less precise manufacturing tolerances than would be needed without the self-aligning features of the thrust trunnion 600. Additionally or alternately, the resilient mounting of the carriage 610 enables the thrust trunnion 600 to account for wobble, eccentricity, warpage or other defects in the tire 106 to reduce wear on the elements of the rotatable drum system 100 and/or reduce expensive and time-consuming maintenance procedures.

Figure 3D:
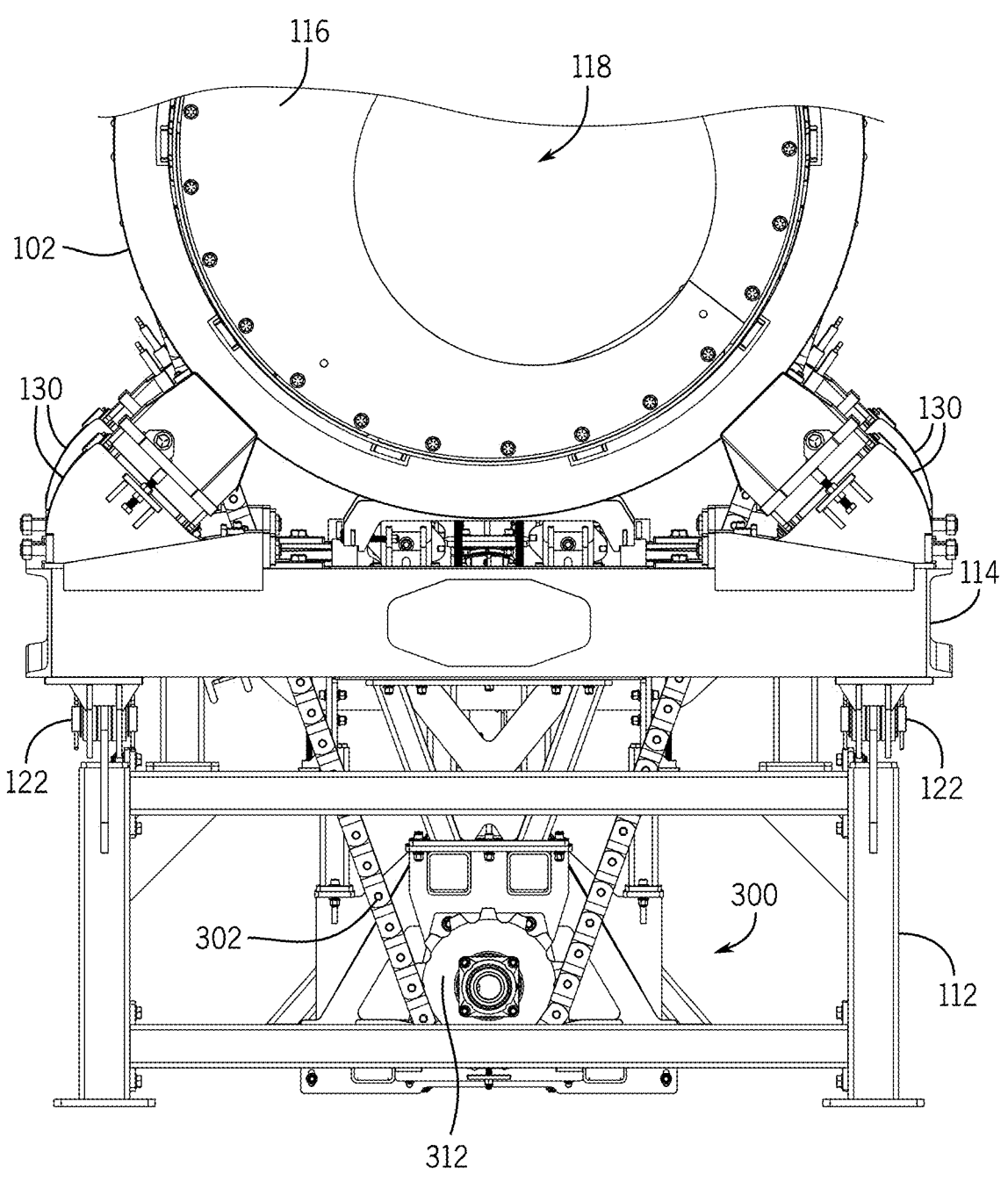
FIG. 3D is an end elevation view of the drive assembly of FIG. 3A.
Figure 3E:
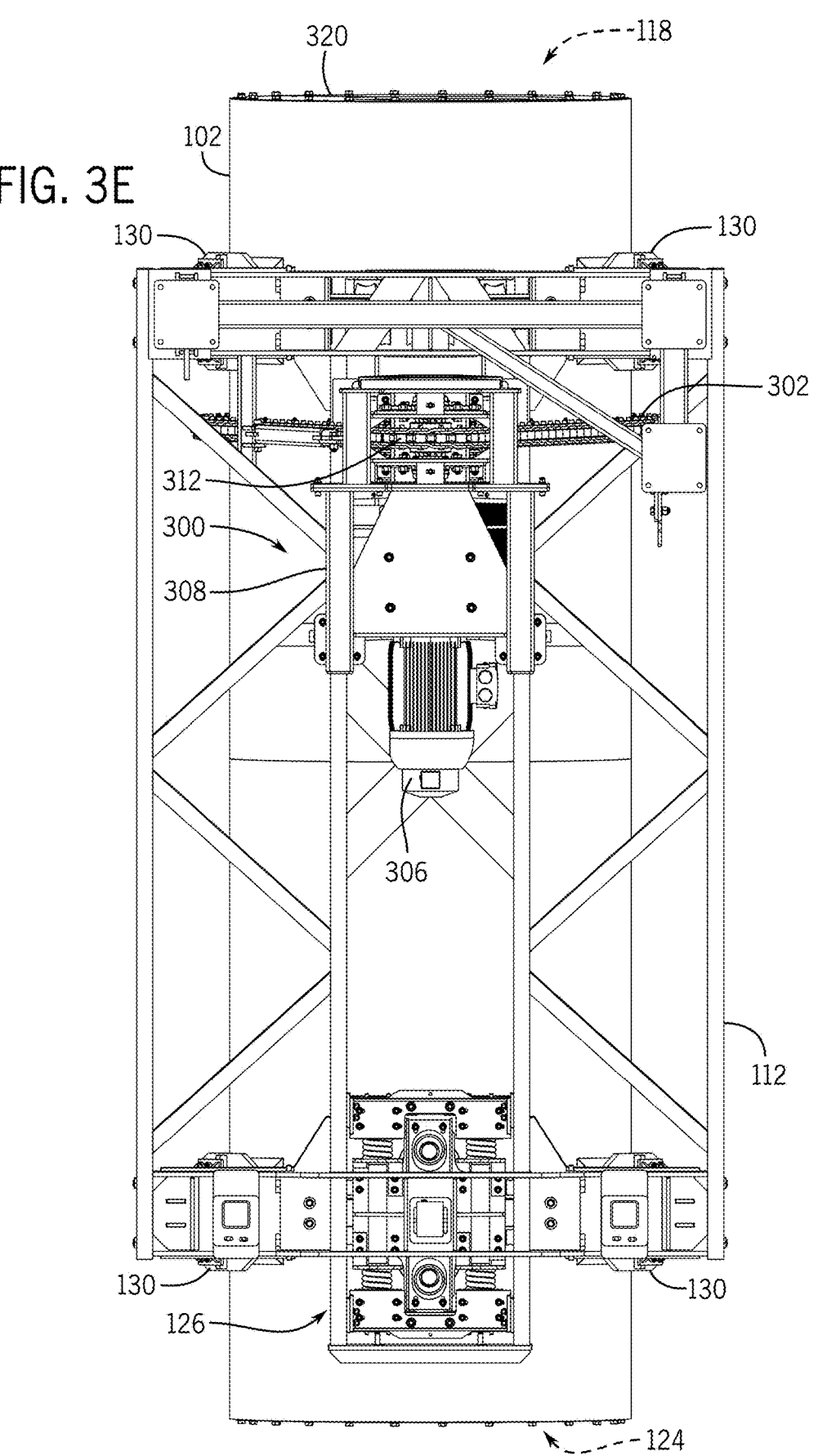
FIG. 3E is a bottom plan view of the drive assembly of FIG. 3A.

As the drum 102 is tilted by the lift mechanism 128, the longitudinal component of the weight of the drum 102 and the material contained therein is increasingly borne by the roller 602*a/b* on the tire closest to the outlet aperture 118 of the drum (FIGS. 1A and 3D). This force may tend to compress the resilient members 606 on the same side of the tire 106 and extend the resilient members 606 on the side of the tire 106 closest to the inlet aperture 124. In both cases, the resilient members 606 may resist such forces to support the tire 106 regardless of the angle at which the drum 102 is tilted, thus retaining the drum 102 on the rotatable drum system 100 as the drum is rotated, e.g., to process MSW. Thus, the thrust trunnion 600 supports the longitudinal loads of the drum 102 and the radial trunnions 500 support the radial loads of the drum 102 to enable the system 100 to effectively operate, e.g., process solid waste.

The trunnion assemblies 500, 600 provided herein may operate mechanically and without the use of an external power source, e.g., without powered rollers or rockers, and rather the trunnion assemblies 500, 600 may facilitate rotation of the drum that is configured to be rotated by the drive system 300, which may itself be powered using electricity or gas.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A vessel for processing a mixture of mixed solid waste (MSW) and water, comprising:
   a cylindrical drum comprising an ingress at a proximal open end and an egress at a distal end, the drum configured to rotate about a longitudinal axis thereof;
   a plurality of paddles joined to an internal surface of the drum and arranged angularly offset from the longitudinal axis; and
   an end cap defining an eccentric opening offset from the longitudinal axis forming the egress at the distal end, wherein the eccentric opening is defined by the end cap such that the end cap forms a first wall portion having a height that is shorter than a second wall portion of the end cap,
   wherein the mixture of MSW and water is received at the ingress during rotation of the drum such that the angularly offset plurality of paddles agitate and urge the received mixture towards the ingress to thereby facilitate retention of the mixture of MSW in the drum, and
   wherein during the rotation of the drum, the mixture advances towards the end cap, and as a level of the mixture reaches the height of the first wall portion, the mixture exits the eccentric opening.

2. The vessel of claim 1, further comprising a plurality of lifters joined to the internal surface of the drum and extending along the longitudinal axis from the ingress to the egress, wherein during the rotation of the drum, the plurality of lifters agitate the mixture within the drum.

3. The vessel of claim 2, wherein at least one of the plurality of lifters is arranged perpendicular to the first wall portion, and wherein a width of the at least one lifter at the first wall portion is the same as the height of the first wall portion such that the at least one lifter guides the mixture out of the egress.

4. The vessel of claim 3, wherein at least one of the plurality of lifters is arranged perpendicular to the second wall portion, and wherein a width of the at least one lifter at the second wall portion is shorter than a height of the second wall portion such that the at least one lifter facilitates retention of the mixture within the drum.

5. The vessel of claim 2, wherein at least one of the plurality of lifters is arranged perpendicular to the second wall portion, and wherein a width of the at least one lifter at the second wall portion is shorter than a height of the second wall portion such that the at least one lifter facilitates retention of the mixture within the drum.

6. The vessel of claim 1, further comprising another plurality of paddles joined to an interior of the drum and arranged angularly offset from the longitudinal axis such that the another plurality of paddles agitate and urge the received mixture towards the egress to thereby facilitate movement of the mixture towards the egress.

7. The vessel of claim 1, wherein the drum is configured to be pivoted about the longitudinal axis from 0 to 25 degrees to adjust a rate of egress of the MSW from the eccentric opening.

8. The vessel of claim 6, further comprising a drive device for causing the drum to rotate, wherein the drive device is configured to pivot with the drum.

9. The vessel of claim 8, wherein the drive device comprises a chain drive.

10. The vessel of claim 1, wherein the drum defines jacketed sidewalls such that the mixture is retained in the drum until reaching the egress.

11. The vessel of claim 1, wherein the plurality of paddles are arranged in a helical pattern around the longitudinal axis.

12. A method of processing a mixture of MSW and water in a drum, comprising:
   rotating a cylindrical drum about a longitudinal axis thereof, the drum comprising an ingress at a proximal open end and an egress at a distal end, a plurality of paddles joined to an internal surface of the drum and arranged angularly offset from the longitudinal axis, and an end cap defining an eccentric opening offset from the longitudinal axis and forming the egress, the eccentric opening defined by a first wall portion of the end cap having a height that is shorter than a second wall portion of the end cap; and
   loading the mixture of MSW and water into the rotating drum at the ingress,
   wherein the mixture of MSW and water is received at the ingress of the drum such that the angularly offset plurality of paddles agitate and urge the received mixture towards the ingress during rotation of the drum to thereby facilitate retention of the mixture of MSW in the drum,
   wherein during the rotation of the drum, the mixture advances towards the eccentric opening, and
   wherein as a level of the mixture reaches the height of the first wall portion, the mixture exits the eccentric opening.

13. The method of claim 12, further comprising pivoting the drum about the longitudinal axis by an angle of about 0.5 to 25 degrees to adjust a residence time of the mixture in the drum.

14. The method of claim 13, wherein a residence time of the mixture in the drum results in organics in the MSW being hydrated to about 70 to about 100 percent.

15. The method of claim 12, wherein prior to the step of loading, further comprising the step of processing the MSW in a bag opener to release MSW from bags.

16. The method of claim 15, wherein the bag opener operates to release MSW from bags using jetted water nozzles, and wherein the mixture of MSW and water is received from the bag opener.

17. The method of claim 16, wherein the mixture of MSW and water is received from the bag opener continuously from a chute leading from the bag opener to the ingress of the drum.

18. The method of claim 12, wherein the water in the mixture is provided at about 50 to 150 gpm.

19. The method of claim 18, wherein the MSW in the mixture is provided at about 100 to 200 pounds per minute.

20. The method of claim 12, further comprising another plurality of paddles joined to an interior of the drum and arranged angularly offset from the longitudinal axis such that during the rotation of the drum, the another plurality of paddles agitate and urge the received mixture towards the egress to thereby facilitate movement of the mixture towards the egress.

* * * * *